US008648964B2

(12) United States Patent
Ishibashi et al.

(10) Patent No.: US 8,648,964 B2
(45) Date of Patent: Feb. 11, 2014

(54) MULTI-PROJECTION DISPLAY SYSTEM AND METHOD OF ADJUSTING BRIGHTNESS THEREOF

(75) Inventors: Osamu Ishibashi, Tokyo (JP); Yoshiho Yanagita, Tokyo (JP); Masahiko Ohta, Tokyo (JP); So Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/885,077

(22) PCT Filed: Nov. 7, 2011

(86) PCT No.: PCT/JP2011/075536
§ 371 (c)(1),
(2), (4) Date: May 13, 2013

(87) PCT Pub. No.: WO2012/073649
PCT Pub. Date: Jun. 7, 2012

(65) Prior Publication Data
US 2013/0229580 A1    Sep. 5, 2013

(30) Foreign Application Priority Data

Nov. 30, 2010    (JP) ................................ 2010-266956

(51) Int. Cl.
*H04N 9/12*    (2006.01)
*H04N 9/31*    (2006.01)
(52) U.S. Cl.
USPC ........................................ 348/383; 348/744
(58) Field of Classification Search
USPC ................ 348/383, 739, 744, 191, 807, 808; 345/1.1, 1.3
IPC ................... H04N 5/66,9/12, 5/64, 9/31, 17/00, H04N 17/02, 9/68, 9/16
See application file for complete search history.

(56) References Cited

U.S. PATENT DOCUMENTS 6,115,022 A *   9/2000   Mayer et al. .................. 348/383
6,671,003 B1 *  12/2003  George et al. ................. 348/191
7,629,610 B2 * 12/2009   Yamazaki et al. .............. 345/77

FOREIGN PATENT DOCUMENTS

| JP | 2002-116500 A | 4/2002 |
| JP | 3575473 B2 | 7/2004 |
| JP | 2006-276629 A | 10/2006 |

(Continued)

OTHER PUBLICATIONS

International Search Report of PCT Application No. PCT/JP2011/075536 mailed on Feb. 7, 2012.

*Primary Examiner* — Sherrie Hsia
(74) *Attorney, Agent, or Firm* — Sughrue Mion, PLLC

(57) ABSTRACT

A multi-projection display system is provided with a plurality of sensor units corresponding to projector units. The sensor units detect brightness for each color in a projected image that is projected on a screen and supply the detection results. The projector unit generates a brightness correction table on the basis of the image signal of a specific picture element of the projected image realized by an adjacent projector unit and on the basis of the brightness of the specific picture element of the projected image of the adjacent projector unit that is detected by a sensor unit for matching the brightness of the image projected by its own projector unit with that of the adjacent projector unit, refers to the brightness correction table to correct brightness for each color of the image signals that are received as input, and projects onto a screen the light of each color in accordance with the corrected image signals.

10 Claims, 16 Drawing Sheets

(56) References Cited

FOREIGN PATENT DOCUMENTS

| | | |
|---|---|---|
| JP | 2008-040206 A | 2/2008 |
| JP | 2009-015125 A | 1/2009 |
| JP | 4345745 B2 | 7/2009 |
| JP | 2009-206665 A | 9/2009 |
| JP | 2009-237240 A | 10/2009 |
| JP | 2010-237633 A | 10/2010 |

* cited by examiner

MULTI-PROJECTION DISPLAY SYSTEM AND METHOD OF ADJUSTING BRIGHTNESS THEREOF

This application is a National Stage Entry of PCT/JP2011/075536 filed Nov. 7, 2011, which claims priority from Japanese Patent Application 2010-266956 filed Nov. 30, 2010, the contents of all of which are incorporated herein by reference, in their entirety.

TECHNICAL FIELD

The present invention relates to multi-projection display system and a method of adjusting the brightness of images projected by each projector unit equipped in the multi-projection display system.

BACKGROUND ART

As a large-scale projection display system, a multi-projection display system is known that projects images onto a screen from a plurality of projector units and that joins each of the projected images together to display them as a single image.

In this type of multi-projection display, variation in the brightness on the screen of each of the images projected from the plurality of projector units greatly influences the quality of the overall projected image.

For example, when the brightness of the projected images differs for each projector unit, the seams between each of the images that are projected on the screen become apparent, greatly detracting from the display quality. Accordingly, the brightness of the projected images for each of the projector units must be accurately matched.

As an example of a method for dealing with this problem, Patent Document 1 discloses projecting a plurality of test images that are mutually non-interfering and independent onto a screen from each of the projector units, capturing each of the test images that are projected onto the screen by a measurement camera that is positioned in front of the screen and measuring the brightness for each image, and then adjusting the brightness among each of the images based on the measurement results.

However, in the above-described multi-projection display system of the background art, an increase in the number of projector units that accompanies enlargement of the screen size results in increased complexity of the processing of the main control unit that implements unified control of the brightness of the projected images of each of the projector units as well as a massive increase in the amount of processing, which leads to the problem in which it becomes difficult to increase the number of projector units.

In addition, when the screen size of the multi-projection display system increases, the range that is captured by the measurement camera must be expanded and the distance between the screen and the measurement camera must be increased. As a result, slimming the thickness of the multi-projection display becomes problematic.

RELATED ART LITERATURE

Patent Documents

Patent Document 1: Japanese Patent No. 3575473

SUMMARY

It is therefore an object of the present invention to provide a large-screen multi-projection display system that is both thin and that allows an increase in the number of projector units with relative ease, as well as to provide a method of adjusting brightness of such a system.

The multi-projection display system according to an exemplary aspect of the present invention for achieving the above-described objects is a multi-projection display system that joins together projected images that are projected onto a screen from a plurality of projector units to display the images as one image and includes:

a plurality of sensor units that are provided corresponding to the projector units and that detect brightness for each color of projected images that are projected on the screen from the projector units and supply the detection results as output;

wherein the projector units each include:

an image signal correction unit that judges whether there is an adjacent projector unit arranged adjacent to its own projector unit, that generates a brightness correction table on the basis of the image signal of a specific picture element of a projected image realized by the adjacent projector unit and on the basis of the brightness of the specific picture element of the projected image of the adjacent projector unit that is detected by the sensor unit for matching the brightness of the projected image of its own projector unit with the brightness of the projected image of the adjacent projector unit, that refers to the generated brightness correction table to correct brightness for each color of the image signals that are supplied as input to its own projector unit, and that supplies as output brightness-corrected image signals that follow correction; and an image projection unit that projects light of each color onto a screen in accordance with image signals that are supplied from the image signal correction unit to display an image.

The brightness adjusting method of the multi-projection display system according to an exemplary aspect of the present invention is a brightness adjusting method of a multi-projection display system that joins together projected images that are projected on a screen from a plurality of projector units to display the projected images as one image; and includes step of:

providing a plurality of sensor units corresponding to the projector units that detect brightness for each color of projected images that are projected onto the screen from the projector units and supply the detection results as output; wherein, each projector unit: judges whether there is an adjacent projector unit that is arranged adjacent to its own projector unit, generates a brightness correction table on the basis of the image signal of a specific picture element of a projected image that is realized by the adjacent projector unit and on the basis of the brightness of the specific picture element of the projected image of the adjacent projector unit that is detected by the sensor unit for matching the brightness of the projected image of its own projector unit with the brightness of the projected image of the adjacent projector unit, and refers to the generated brightness correction table to correct brightness for each color of image signals that are applied as input to its own projector unit; and projects light of each color onto the screen in accordance with the brightness-corrected image signals that follow correction to display an image.

EXEMPLARY EMBODIMENT

The present invention is next described using the accompanying drawings.

First Exemplary Embodiment

Figure 1:
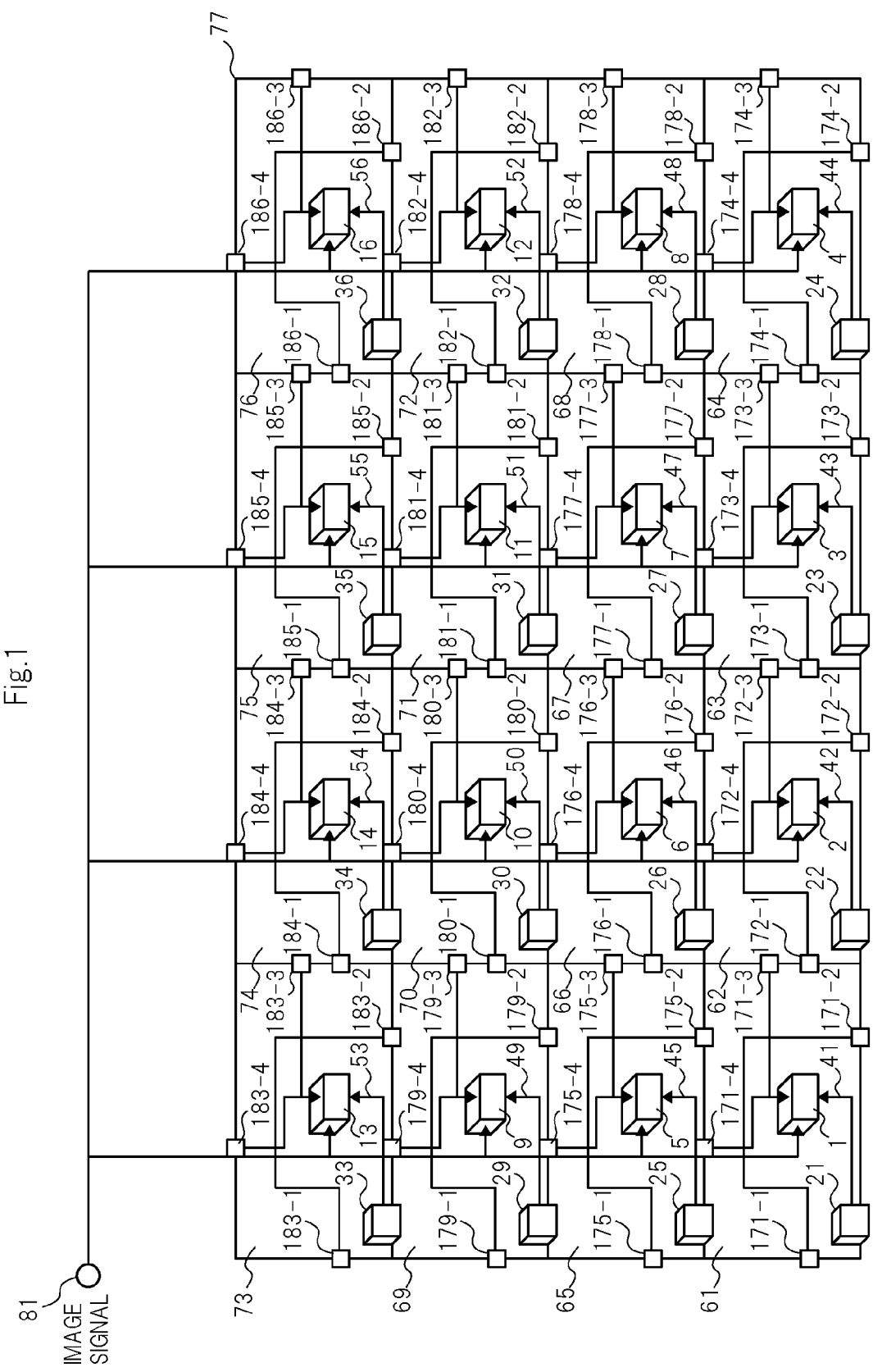
FIG. 1 is a plan view showing an example of the configuration of the multi-projection display system of the first exemplary embodiment.
Figure 2:
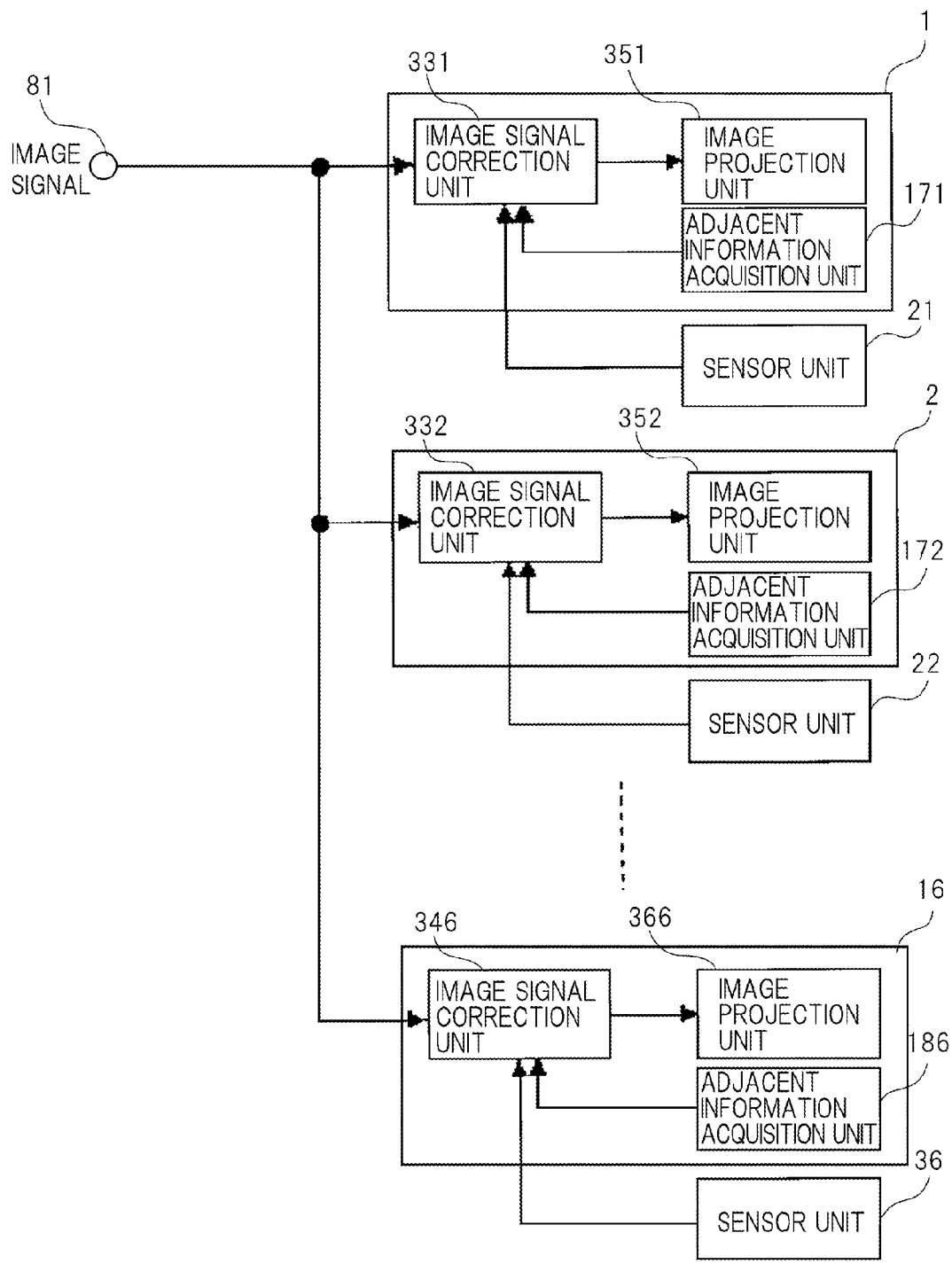
FIG. 2 is a block diagram showing an example of the configuration of the projector units shown in FIG. 1.

FIG. 1 is a plan view showing an example of the configuration of the multi-projection display system of the first exemplary embodiment, and FIG. 2 is a block diagram showing an example of the configuration of the projector unit shown in FIG. 1.

As shown in FIG. 1, the multi-projection display system of the first exemplary embodiment includes a plurality of projector units 1-16, a plurality of sensor units 21-36, and adjacent information acquisition units 171-186. Sensor units 21-36 and adjacent information acquisition units 171-186 are provided one-to-one for each of projector units 1-16. However, adjacent information acquisition units 171-186 are provided in each of the four surfaces (the upper, lower, right, and left side of the figure) for each projector unit to detect projector units that are arranged adjacent to the corresponding projector unit (hereinbelow referred to as "adjacent projector units"). For example, in the case of projector unit 1, adjacent information acquisition units 171-1-171-4 are provided to correspond to projector unit 1. The other adjacent information acquisition units 172-186 are similar. In addition, 61-77 of FIG. 1 each indicate the size on the screen of the projected images that are projected from each of projector units 1-16. Sensor units 21-36 are installed at positions that allow detection of the brightness of a specific picture element of the projected images that are projected onto the screen from projector units 1-16.

As shown in FIG. 2, projector units 1-16 are each equipped with respective image signal correction unit 331, image projection unit 351, and adjacent information acquisition unit 171. Image signals are applied as input from an image reproduction device (not shown in figures) to projector units 1-16 by way of image signal input unit 81.

Sensor units 21-36 detect the brightness of each color of the projected images that are projected onto a screen from image projection units 351-366 and supply the detection results to image signal correction units 331-346.

Adjacent information acquisition units 171-186 judge whether there are adjacent projector units and supply the judgment results as adjacent information to image signal correction units 331-346.

Each of image signal correction units 331-346 generates a brightness correction table on the basis of an image signal that corresponds to a specific picture element of the projected image that is projected onto the screen from an adjacent projector unit and on the basis of the brightness of the specific picture element of the projected image of the adjacent projector unit that is detected by the corresponding sensor unit for matching the brightness of the projected image of its own projector unit with the brightness of the projected image of the adjacent projector unit. In addition, each of image signal correction units 331-346 refers to the generated brightness correction table to correct brightness for each color of the image signals that are applied as input to its own projector unit and supplies as output the brightness-corrected image signals that follow correction.

Each of image projection units 351-366 projects light of each color onto the screen in accordance with the brightness-corrected image signals supplied from image signal correction units 331-346.

The operations of projector units 1-16 shown in FIG. 1 are next described using the accompanying drawings. The processes described hereinbelow are executed by each of corresponding image signal correction units 331-346 provided in projector units 1-16.

Figure 3:
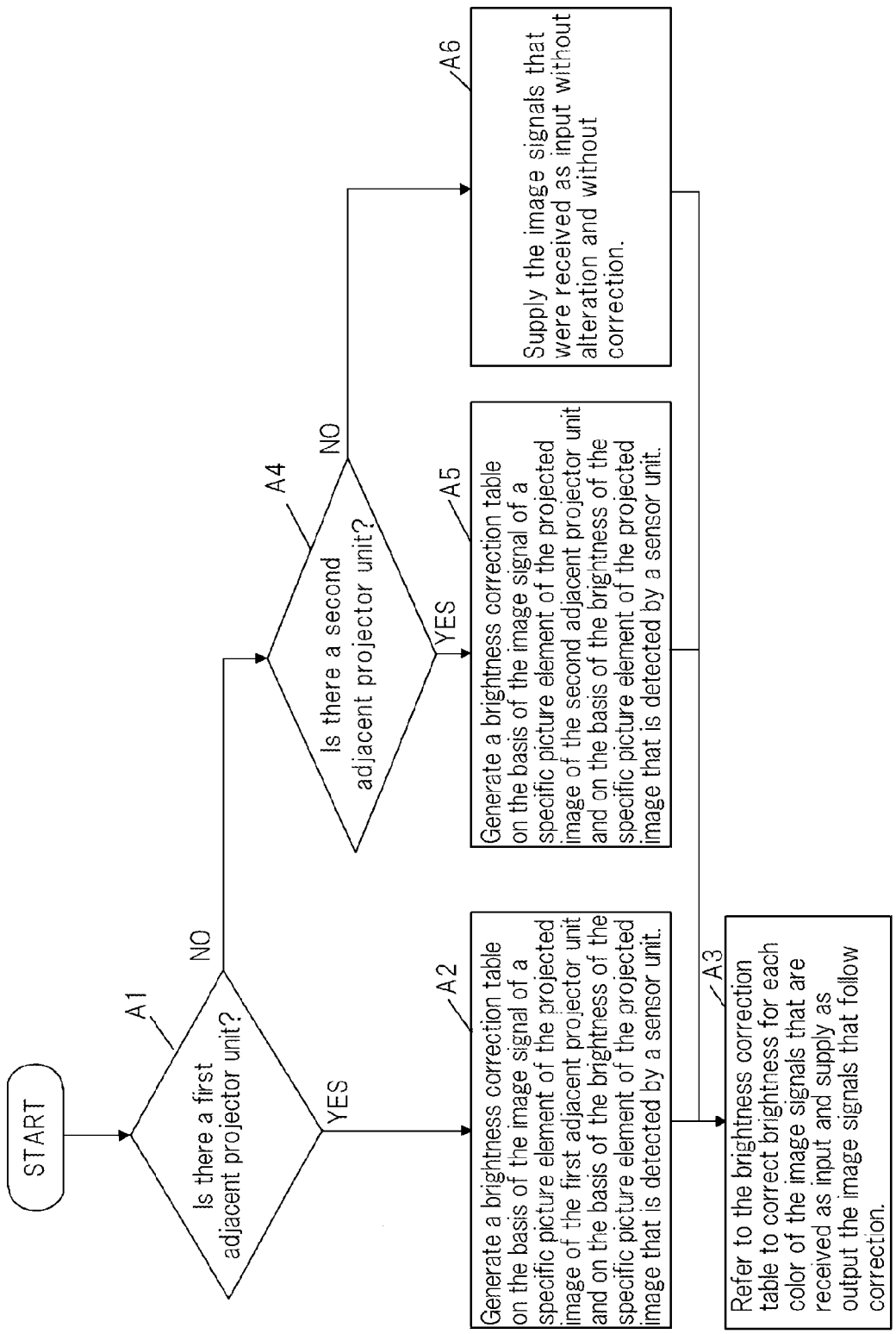
FIG. 3 is a flow chart showing the processing procedure of the image signal correction units shown in FIG. 2.

FIG. 3 is a flow chart showing the processing procedure of the image signal correction unit shown in FIG. 2.

As shown in FIG. 3, each of image signal correction units 331-346, based on adjacent information that is supplied from the adjacent information acquisition unit that corresponds to its own projector unit, judges whether there is a first adjacent projector unit that is adjacent to its own projector unit in a first direction that is set in advance (Step A1). The first direction refers to, for example, the rightward direction or the leftward direction of its own projector unit when projector units 1-16 are arranged as shown in FIG. 1.

If there is a first adjacent projector unit, each of image signal correction units 331-346 generates the above-described brightness correction table from the image signal that corresponds to a specific picture element of the projected image realized by the first adjacent projector unit and the brightness of the specific picture element of the projected image realized by the first adjacent projector unit that is detected by a corresponding sensor unit (Step A2).

Image signal correction units 331-346 next refer to the brightness correction table generated in Step A2 to correct brightness for each color of the image signals that are applied as input to its own projector unit and supplies as output the brightness-corrected image signals that follows correction (Step A3).

If it is judged in Step A1 that there is no first adjacent projector unit, each of image signal correction units 331-346 judges whether there is a second adjacent projector unit that is adjacent to its own projector unit in a second direction that crosses the above-described first direction (Step A4). The second direction refers to, for example, the upward direction or downward direction of its own projector unit when projector units 1-16 are arranged as shown in FIG. 1.

If there is a second adjacent projector unit, image signal correction units 331-346 each generate the above-described brightness correction table from the image signal that corresponds to a specific picture element of the projected image realized by the second adjacent projector unit and the brightness of the specific picture element of the projected image realized by the second adjacent projector unit that is detected by a corresponding sensor unit (Step A5).

Each of image signal correction units 331-346 next refers to the brightness correction table generated in Step A5 to correct the brightness of each color of the image signals that are applied as input to its own projector unit and supplies as output the brightness-corrected image signals that follow correction (Step A3).

When there is no second adjacent projector unit in Step A4, image signal correction units 331-346 supply as output the image signals that are applied as input to its own projector unit unchanged and without correction (Step A6).

In the multi-projection display system described hereinabove, each of projector units 1-16 autonomously adjusts the brightness of the projected image of its own projector unit to match the brightness of the projected image of an adjacent projector unit, whereby the brightness of the projected image of each of projector units 1-16 ultimately matches the brightness of the projected image of the projector unit for which it is judged that the above-described first and second adjacent projector units do not exist. In other words, the brightness of the projected images of all projector units 1-16 that are projected onto a screen can be matched.

According to the multi-projection display system of the first exemplary embodiment, each of projector units 1-16 autonomously adjusts the brightness of its own projected image such that its brightness matches that of the projected image of an adjacent projector unit, whereby the processing load of brightness adjustment does not concentrate in, for example, the above-described main control unit even when additional projector units are installed. Accordingly, the number of projector units can be increased with relative ease.

In addition, the brightness detection range of projected images by each of sensor units 21-36 is limited to the range of the level of the projected image that is projected onto the screen from one projector unit, and as a result, the distance between sensor units 21-36 and the screen need not be extended as in the background art. As a result, a large-screen multi-projection display system can be provided in thin form.

Second Exemplary Embodiment

The multi-projection display system of the second exemplary embodiment is next described using the accompanying drawings.

Figure 4:
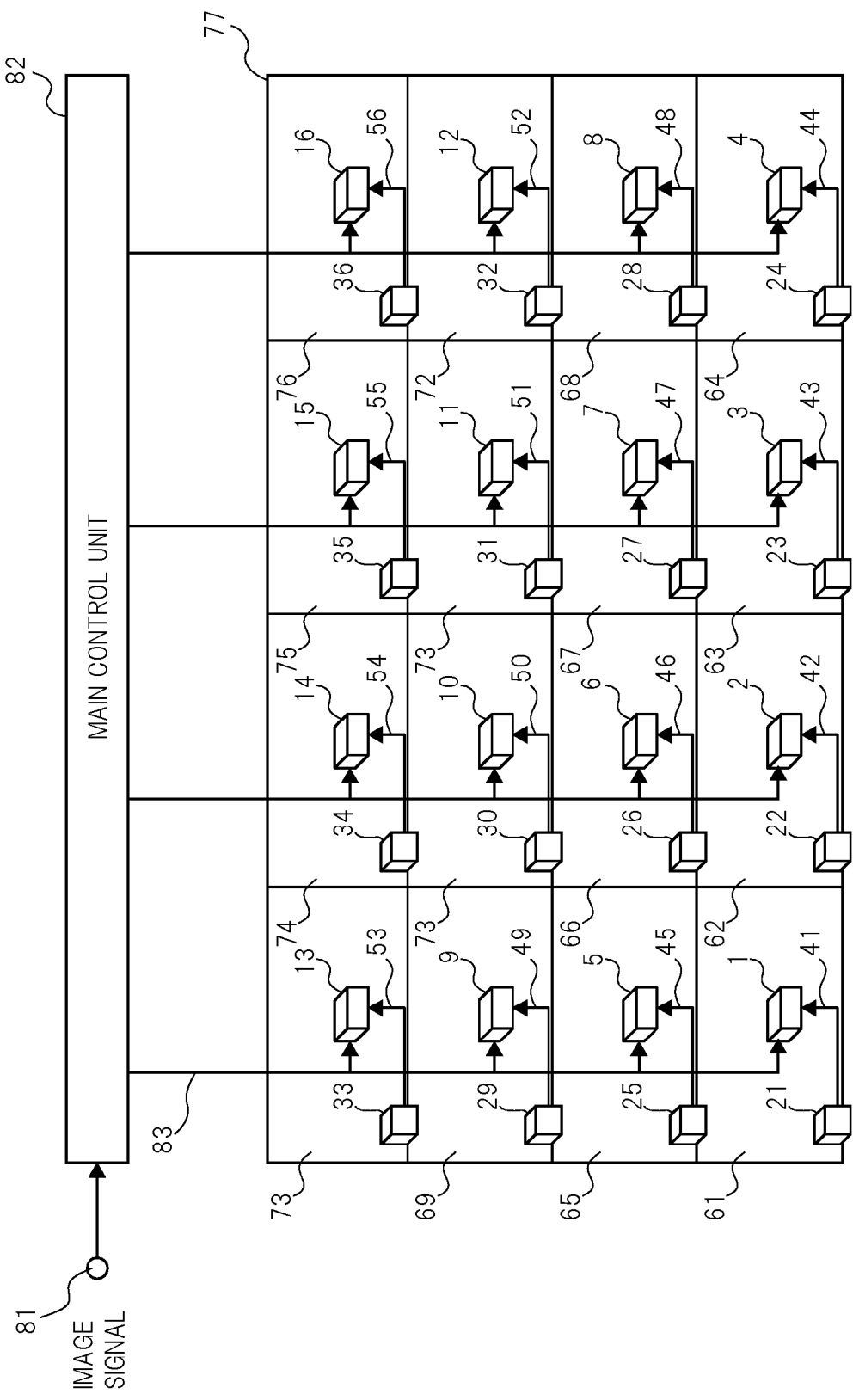
FIG. 4 is a plan view showing an example of the configuration of the multi-projection display system of the second exemplary embodiment.
Figure 5:
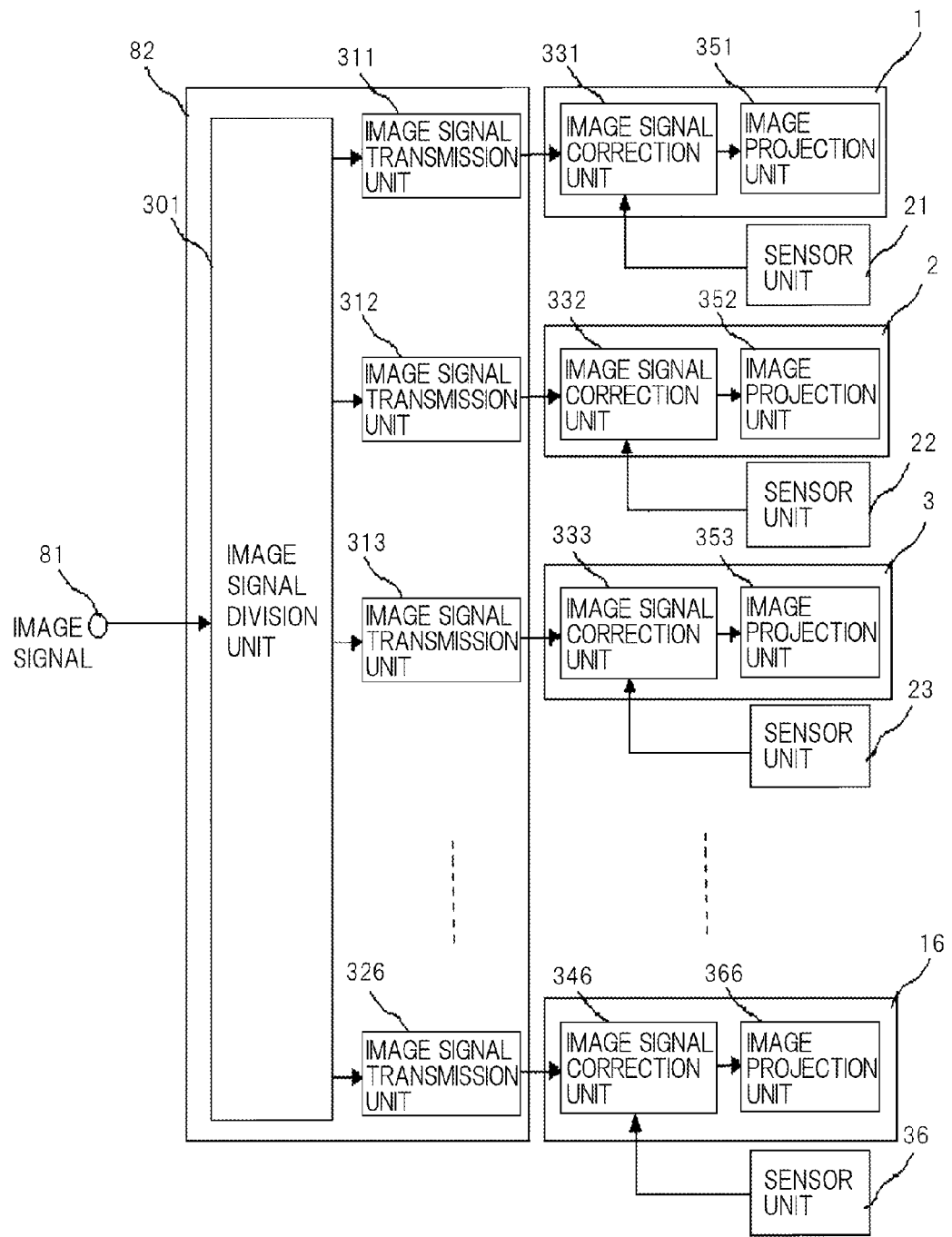
FIG. 5 is a block diagram showing an example of the configuration of the main control unit and the projector units shown in FIG. 4.

FIG. 4 is a plan view showing an example of the configuration of the multi-projection display system of the second exemplary embodiment, and FIG. 5 is a block diagram showing an example of the configuration of the main control unit and projector unit shown in FIG. 4.

As shown in FIG. 4, the multi-projection display system of the second exemplary embodiment includes a plurality of projector units 1-16, a plurality of sensor units 21-36, and main control unit 82. Sensor units 21-36 are provided one-to-one in correspondence with each of projector units 1-16. Reference numbers 61-77 in FIG. 4 each indicate the size on the screen of the projected images that are projected from each of projector units 1-16. Sensor units 21-36 are each arranged at positions that allow the detection of the brightness of specific picture elements (picture elements on the outermost periphery) of the projected images that are projected on the screen from projector unit 1-16.

As shown in FIG. 5, main control unit 82 is equipped with image signal division unit 301 and image signal transmission units 311-326. Each of projector units 1-16 is further equipped with image signal correction unit 331 and image projection unit 351.

Image signals are applied as input to main control unit 82 from an image reproduction device (not shown) by way of image signal input unit 81. Main control unit 82 divides the image signals that are received as input and distributes corresponding image signals to each of projector units 1-16.

Image signal division unit 301 both divides the image signals that are received as input to image signals that correspond to each of projector units 1-16 and adds to the image signals one or more picture element signals of the outermost periphery of the projected images realized by each of the adjacent projector units and distributes the image signals that include the added signals to each of projector units 1-16. In main control unit 82, the absence or existence of adjacent projector units for each of projector units 1-16 is already known. Image signal division unit 301 both divides the image signals that are received as input into image signals that correspond to each of projector units 1-16 and generates adjacent information that indicates whether there are adjacent projector units for each of the projector units.

Image signal transmission units 311-326 transmit the image signals and the adjacent information that are supplied as output from image signal division unit 301 to each of corresponding projector units 1-16.

Sensor units 21-36 detect the brightness of each color of projected images that are projected onto the screen from image projection units 351-366 and supply the detection results to image signal correction units 331-346.

Image signal correction units 331-346 each generate brightness correction tables on the basis of the image signals of picture elements of the outermost periphery of the projected images that are projected onto the screen from adjacent projector units and on the basis of the brightness of the picture elements of the outermost periphery of the projected images of the adjacent projector units that were detected in the corresponding sensor units for matching the brightness of the projected image of its own projector unit with the brightness of the projected images of the adjacent projector units. In addition, image signal correction units 331-346 further refer to the generated brightness correction tables to correct brightness for each color of the image signals that are applied as input to its own projector unit and supply the brightness-corrected image signals that follow correction.

Image projection units 351-366 project the light of each color onto the screen in accordance with the brightness-corrected image signals that are supplied as output from image signal correction units 331-346.

The operations of projector units 1-16 shown in FIG. 4 are next described using the accompanying drawings. The processes described hereinbelow are executed in corresponding image signal correction units 331-346 that are equipped in projector units 1-16.

Figure 6:
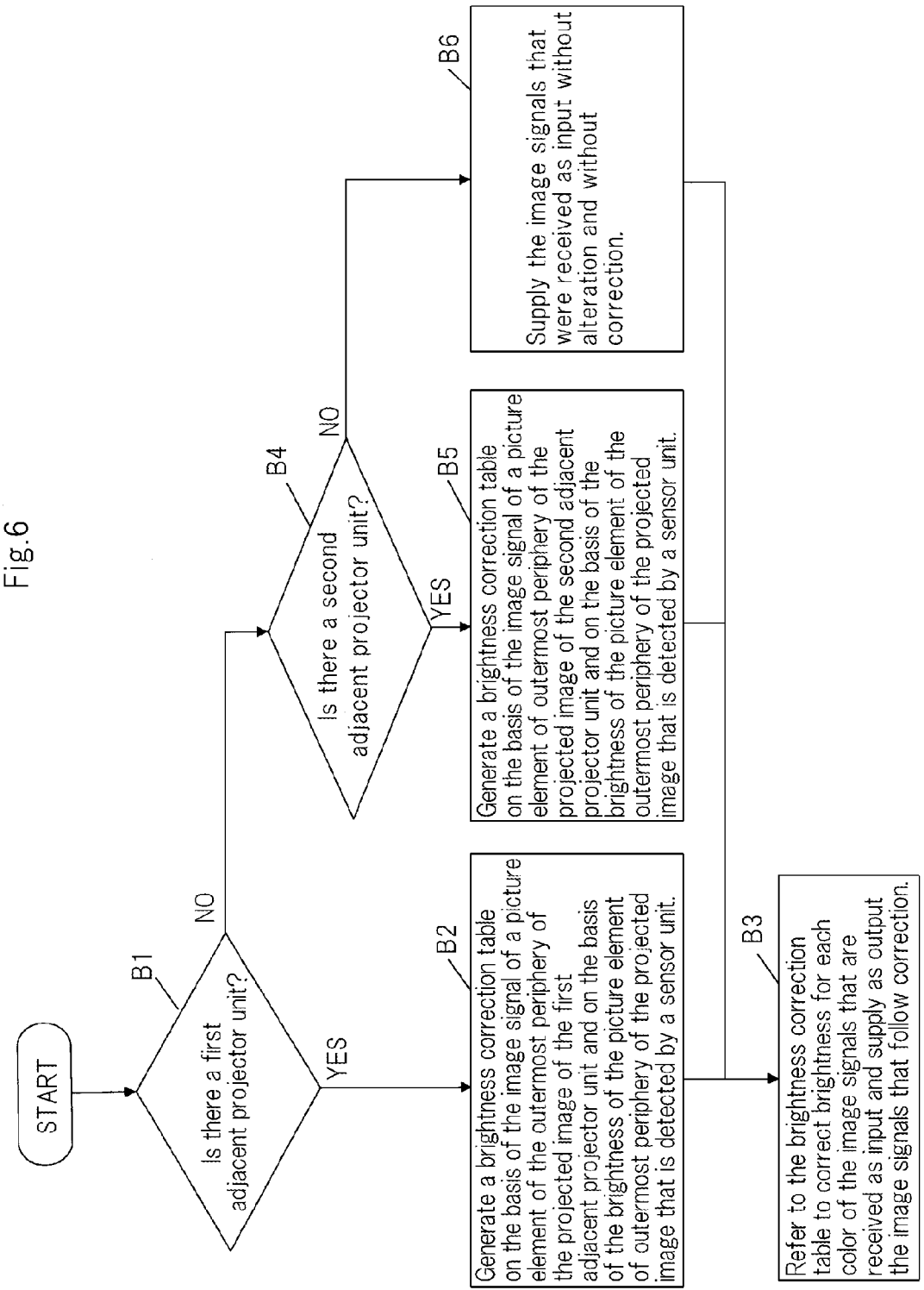
FIG. 6 is a flow chart showing the processing procedure of the image signal correction units shown in FIG. 5.

FIG. 6 is a flow chart showing the processing procedure of the image signal correction units shown in FIG. 5.

As shown in FIG. 6, each of image signal correction units 331-346 first judges whether there is a first adjacent projector unit that is adjacent to its own projector unit in a first direction that is set in advance based on adjacent information that is supplied as output from image signal division unit 301 (Step B1). The first direction refers to, for example, the direction leftward or rightward of its own projector unit when projector units 1-16 are arranged as shown in FIG. 4.

When there is a first adjacent projector unit, each of image signal correction units 331-346 generates the above-described brightness correction table on the basis of the image signal of a picture element on the outermost periphery of the projected image realized by the first adjacent projector unit and on the basis of the brightness of the picture element of the outermost periphery of the projected image realized by the first adjacent projector unit that was detected by the corresponding sensor unit (Step B2).

Each of image signal correction units 331-346 next refers to the brightness correction table that was generated in Step B2 to correct brightness for each color of the image signals that are applied as input to its own projector unit and supplies the brightness-corrected image signals that follow correction (Step B3).

When it is judged in Step B1 that there is no first adjacent projector unit, each of image signal correction units 331-346 judges whether there is a second adjacent projector unit that is adjacent to its own projector unit in a second direction that crosses the above-described first direction (Step B4). The second direction refers to, for example, the direction upward or downward of its own projector unit when projector units 1-16 are arranged as shown in FIG. 4.

When there is a second adjacent projector unit, each of image signal correction units 331-346 generates the above-described brightness correction table on the basis of the image signal of the picture element of the outermost periphery of the projected image realized by the second adjacent projector unit and on the basis of the brightness of the picture element of the outermost periphery of the projected image realized by the second adjacent projector unit that was detected by the corresponding sensor unit (Step B5).

Each of image signal correction units 331-346 next refers to the brightness correction table that was generated in Step B5 to correct brightness for each color of the image signals that are applied as input to its own projector unit and supplies as output the brightness-corrected image signals that follow correction (Step B3).

When it is judged in Step B4 that there is no second adjacent projector unit, each of image signal correction units 331-346 supplies as output the image signals that are applied as input to its own projector unit without change and without correction (Step B6).

According to the multi-projection display system of the second exemplary embodiment, as with the first exemplary embodiment, each of projector units 1-16 autonomously adjusts the brightness of the projected image of its own projector unit to match the brightness of the projected image of an adjacent projector unit, and as a result, the brightness of the projected images of each of projector units 1-16 ultimately matches the brightness of the projected image of the projector unit for which it is judged that the above-described first and second adjacent projector units do not exist. In other words, the brightness of the projected images of all of projector units 1-16 that are projected onto the screen can be matched.

Accordingly, the processing load of brightness adjustment is not concentrated in components such as main control unit 82 even when additional projector units are installed. As a result, the number of projector units can be increased with relative ease.

In addition, the brightness detection range of projected images realized by each of sensor units 21-36 is limited to within a range of the level of the projected image that is projected onto the screen from one projector unit, whereby the distance between sensor units 21-36 and the screen need not be extended as in the background art. As a result, a large-screen multi-projection display system can be provided in thin form.

In the multi-projection display system of the second exemplary embodiment, moreover, adjacent information indicating the absence or existence of an adjacent projector unit is supplied to each of projector units 1-16 from main control unit 82, whereby the need for adjacent information acquisition units 171-186 shown in the first exemplary embodiment is eliminated. Accordingly, the multi-projection display system can be configured more easily and at lower cost than in the first exemplary embodiment.

Third Exemplary Embodiment

The multi-projection display system of the third exemplary embodiment is next described using the accompanying drawings.

Figure 7:
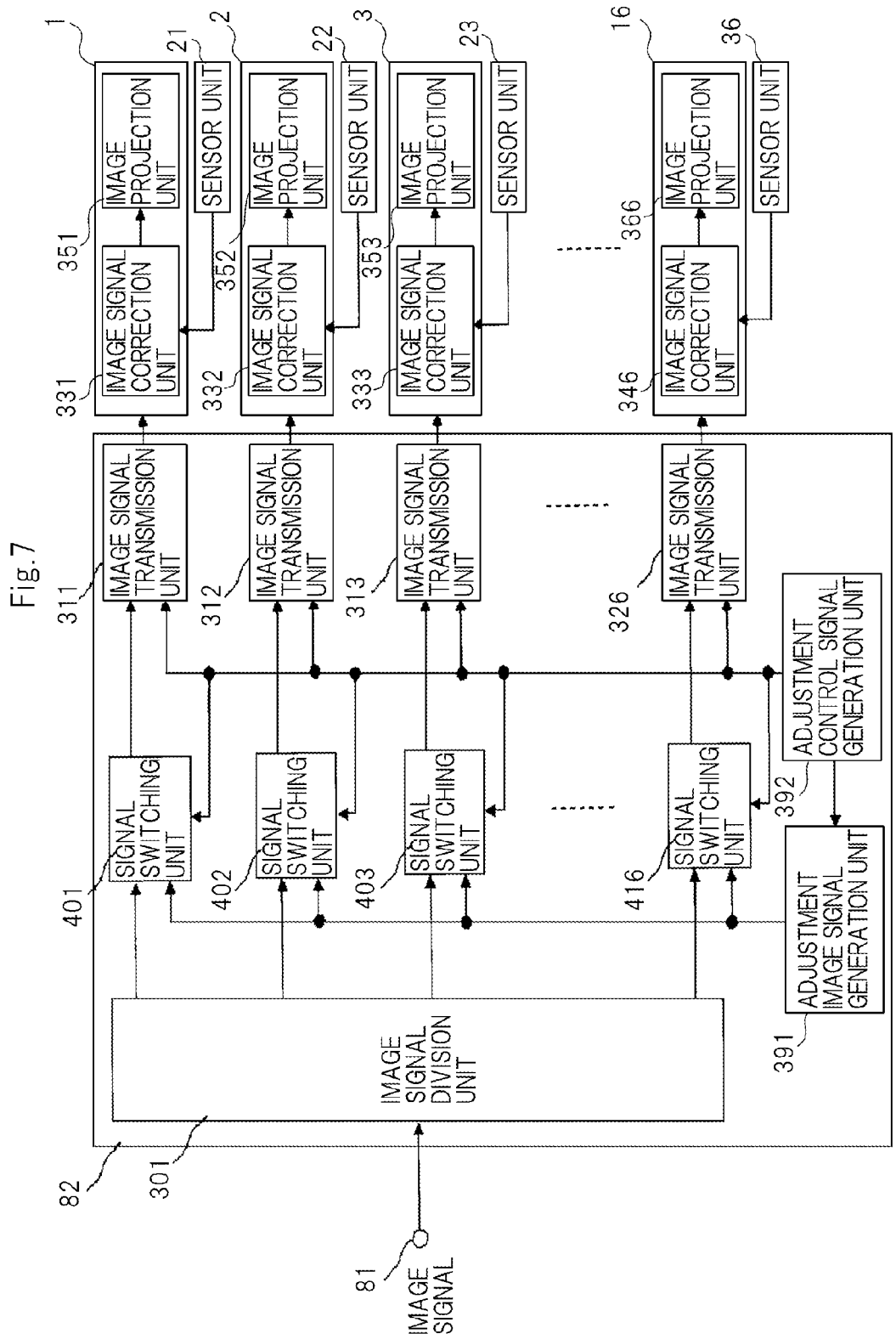
FIG. 7 is a block diagram showing an example of the configuration of the main control unit and projector units that are provided in the multi-projection display system of the third exemplary embodiment.

FIG. 7 is a block diagram showing an example of the configuration of the main control unit and projector units that are equipped in the multi-projection display system of the third exemplary embodiment.

The multi-projection display system of the third exemplary embodiment differs from the multi-projection display system of the second exemplary embodiment shown in FIG. 4 in regard to the configuration of main control unit 82. The configuration is otherwise the same as that of the multi-projection display system of the second exemplary embodiment.

As shown in FIG. 7, the multi-projection display system of the third exemplary embodiment includes a plurality of projector units 1-16, a plurality of sensor units 21-36, and main control unit 82. Sensor units 21-36 are provided one-to-one in correspondence with each of projector units 1-16.

Main control unit 82 is equipped with image signal division unit 301, adjustment image signal generation unit 391, signal switching units 401-416, adjustment control signal generation unit 392, and image signal transmission units 311-326. Projector units 1-16 are equipped with image signal correction unit 331 and image projection unit 351.

Image signals are applied as input to main control unit 82 from an image reproduction device (not shown in the figures) by way of image signal input unit 81. Main control unit 82 divides the image signals that are received as input and distributes the corresponding image signals to each of projector units 1-16.

In main control unit 82, the absence or existence of adjacent projector units that correspond to each of projector units 1-16 is already known. Image signal division unit 301 both divides the image signals that are received as input into image signals that correspond to each of projector units 1-16 and generates adjacent information that indicates the absence or existence of adjacent projector units for each projector unit.

Adjustment image signal generation unit 391 generates predetermined image signals for adjustment. The image signals for adjustment are image signals for displaying images for adjustment that are used when adjusting brightness on each of projector units 1-16. The images for adjustment are, for example, images that display specific picture elements in predetermined colors and predetermined brightness, and picture elements other than the specific picture elements display black (brightness level of 0%).

Adjustment control signal generation unit 392 supplies adjustment control signals that instruct the timing of execution of brightness adjustment to each of projector units 1-16.

Signal switching units 401-416 switch output signals in accordance with adjustment control signals that are supplied from adjustment control signal generation unit 392. Signal switching units 401-416 supply as output image signals that are supplied from image signal division unit 301 during normal display and supply as output image signals for adjustment that are supplied from adjustment image signal generation unit 391 at the time when brightness is adjusted.

Image signal transmission units 311-326 transmit image signals that are supplied as output from signal switching units 401-416, adjacent information, and adjustment control signals that are supplied from adjustment control signal generation unit 392 to each of corresponding projector units 1-16.

Sensor units 21-36 detect brightness for each color of the projected images that are projected on the screen from image projection units 351-366 and supply the detection results to image signal correction units 331-346.

Each of image signal correction units 331-346 generates a brightness correction table on the basis of the image signals of the projected image that is projected on the screen from an adjacent projector unit and on the basis of the brightness of the projected image of the adjacent projector unit that is detected by the corresponding sensor unit for matching the brightness of the projected image of its own projector unit to the brightness of the projected image of the adjacent projector unit. Each of image signal correction units 331-346 further refers to the generated brightness correction table to correct brightness for each color of the image signals that are applied as input to its own projector unit and supplies the brightness-corrected image signals that follow correction.

Image projection units 351-366 project light of each color in accordance with the brightness-corrected image signals that are supplied as output from image signal correction units 331-346.

The operations of projector units 1-16 shown in FIG. 7 are next described using the accompanying drawings. The processes described hereinbelow are each executed in corresponding image signal correction units 331-346 that are provided in projector units 1-16.

Figure 8:
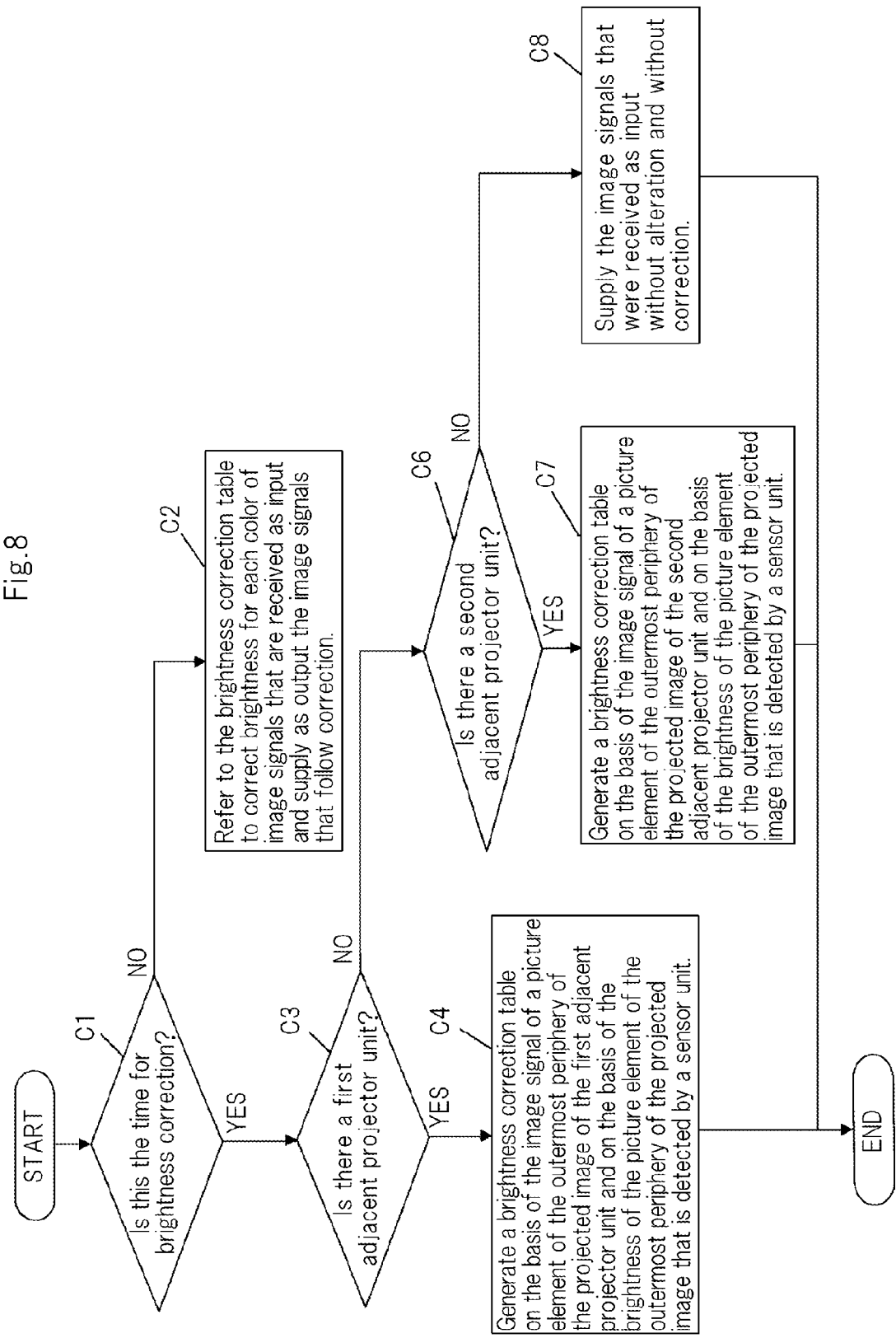
FIG. 8 is a flow chart showing the processing procedure of the image signal correction units shown in FIG. 7.

FIG. 8 is a flow chart showing the processing procedure of the image signal correction unit shown in FIG. 7.

As shown in FIG. 8, image signal correction units 331-346 judge whether projector units 1-16 are in a time of normal display or in a time of brightness adjustment based on the adjustment control signal supplied from adjustment control signal generation unit 392 (Step C1).

At the time of normal display, each of image signal correction units 331-346 refers to a brightness correction table to correct brightness for each color of the image signals that are applied as input to its own projector unit and supplies as output the brightness-corrected image signals that follow correction (Step C2).

When the time of brightness adjustment in Step C1 has been determined, each of image signal correction units 331-346 first judges whether there is a first adjacent projector unit that is adjacent to its own projector unit in the first direction that has been set in advance based on adjacent information that is supplied from image signal division unit 301 (Step C3). The first direction refers to, for example, the direction leftward or rightward of its own projector unit when projector units 1-16 are arranged as shown in FIG. 4.

When there is a first adjacent projector unit, each of image signal correction units 331-346 generates the above-described brightness correction table on the basis of the image signals of the projected image that is realized by the first adjacent projector unit and on the basis of the brightness of the projected image that is realized by the first adjacent projector unit that is detected by the corresponding sensor unit (Step C4).

When it is judged that there is no first adjacent projector unit in Step C3, each of image signal correction units 331-346 judges whether there is a second adjacent projector unit that is adjacent to its own projector unit in a second direction that crosses the above-described first direction (Step C6). The second direction refers to, for example, a direction that is upward or downward from its own projector unit when projector units 1-16 are arranged as shown in FIG. 4.

When there is a second adjacent projector unit, each of image signal correction units 331-346 generates the above-described brightness correction table on the basis of the image signals of the projected image that is realized by the second adjacent projector unit and on the basis of the brightness of the projected image that is realized by the second adjacent projector unit that is detected by the corresponding sensor unit (Step C7).

When it is judged that there is no second adjacent projector unit in Step C6, each of image signal correction units 331-346 supplies as output the image signals that are applied as input to its own projector unit without alteration and without correction (Step C8).

According to the multi-projection display system of the third exemplary embodiment, as with the first and second exemplary embodiments, each of projector units 1-16 autonomously adjusts the brightness of the projected image of its own projector unit to match the brightness of the projected image of an adjacent projector unit, whereby the brightness of the projected images of each of projector units 1-16 ultimately matches the brightness of the projected image of the projector unit for which it is judged that the above-described first and second adjacent projector units do not exist. In other words, the brightness of the projected images of all projector units 1-16 that are projected on the screen can be matched.

Accordingly, the processing load of brightness adjustment is not concentrated in components such as main control unit 82 even when additional projector units are installed. As a result, the number of projector units can be increased with relative ease.

In addition, the range of brightness detection of projected images realized by each of sensor units 21-36 is limited to within a range of the level of the projected image that is projected upon a screen from one projector unit, whereby the distance between sensor units 21-36 and the screen need not be extended as in the background art. As a result, a large-screen multi-projection display system can be provided in thin form.

Still further, in the multi-projection display system of the third exemplary embodiment, adjacent information that indicates the absence or existence of adjacent projector units is supplied from main control unit 82 to each of projector units 1-16 and the adjacent information acquisition units 171-186 shown in the first exemplary embodiment are therefore unnecessary. Accordingly, the multi-projection display system can be configured more easily and at lower cost than that of the first exemplary embodiment.

Working examples of the present invention are next described using the accompanying drawings.

First Working Example

Figure 9:
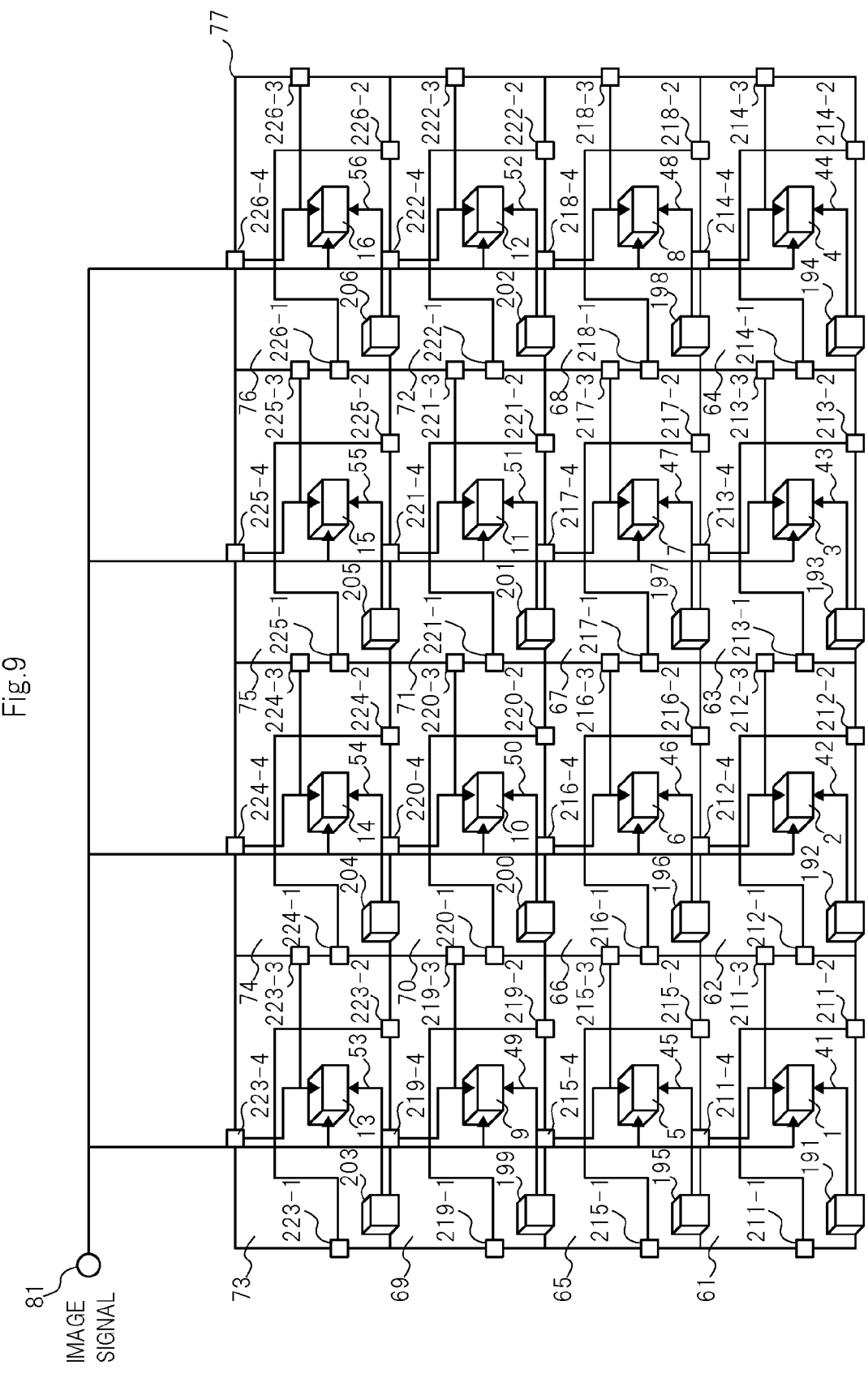
FIG. 9 is a plan view showing the configuration of the multi-projection display system of the first working example.

FIG. 9 is a plan view showing the configuration of the multi-projection display system of the first working example.

In the first working example, an actual example of the multi-projection display system of the above-described first exemplary embodiment is described.

As shown in FIG. 9, the multi-projection display system of the first working example includes a plurality of projector units 1-16, a plurality of camera units 194-206, and mechanical switches for adjacent information acquisition 211-226.

Camera units 194-206 correspond to sensor units 21-36 shown in FIG. 1, and mechanical switches for adjacent information acquisition 211-226 correspond to adjacent information acquisition units 171-186 shown in FIG. 1.

Camera units 194-206 and mechanical switches for adjacent information acquisition 211-226 are provided one-to-one in correspondence with each of projector units 1-16. However, mechanical switches for adjacent information acquisition 211-226 are provided on each of four surfaces, i.e., the upper, lower, rightward, and leftward surfaces of projector units in the figure to detect adjacent projector units. In the following explanation, the projector units as well as the camera units and mechanical switches for adjacent information acquisition that are provided and that correspond to the projector units are referred to as "projection display units." Reference numbers 61-77 of FIG. 9 further show the sizes on the screen of projected images that are projected from each of projector units 1-16.

Figure 10:
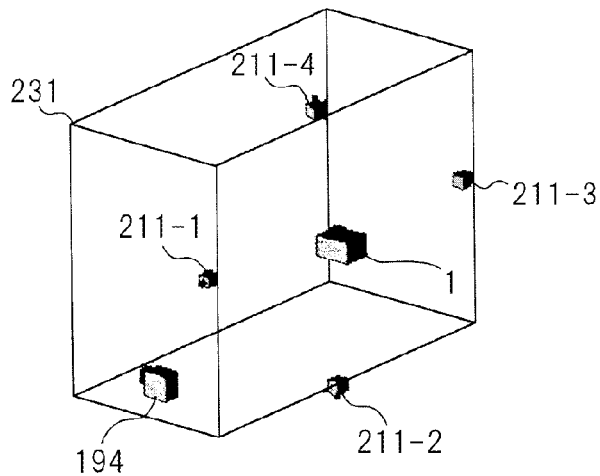
FIG. 10 is a schematic view showing an example of the configuration of the projection display units shown in FIG. 9.

FIG. 10 is a schematic view showing an example of the configuration of the projection display units shown in FIG. 9.

FIG. 10 shows an example of the configuration of a projection display unit that is equipped with camera unit 194, mechanical switches for adjacent information acquisition 211-1-211-4, and case 231 corresponding to projector unit 1.

As shown in FIG. 10, camera unit 194 is installed at a position that allows detection of the brightness of a specific picture element of the projected image that is projected onto the screen from projector unit 1. Mechanical switches for adjacent information acquisition 211-1-211-4 are provided on each of the four surfaces, i.e., the upper, lower, leftward, and rightward surfaces of case 231.

Figure 11:
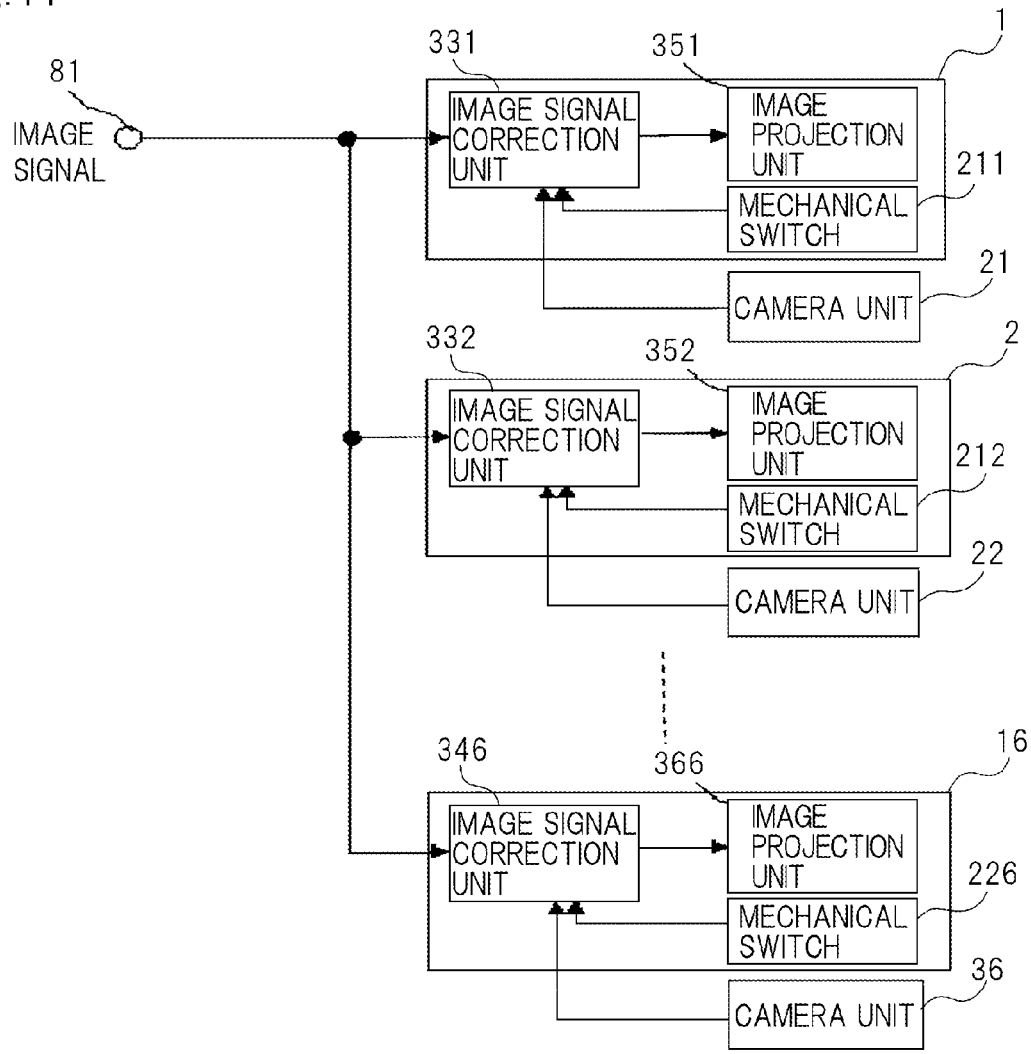
FIG. 11 is a block diagram showing an example of the configuration of the projector units shown in FIG. 9.

FIG. 11 is a block diagram showing an example of the configuration of the projector units shown in FIG. 9.

As shown in FIG. 11, projector units 1-16 are each provided with image signal correction units 331, and image projection units 351, and mechanical switches for adjacent information acquisition 211-226. Camera units 21-36 that correspond to the projector units in projector units 1-16 are provided and installed. Image signals from an image reproduction device (not shown) are applied as input to projector units 1-16 by way of image signal input unit 81.

Camera units 21-36 capture the projected images that are projected onto the screen from image projection units 351-366, detect brightness for each color of the projected images, and supply the detection results to image signal correction units 331-346.

Mechanical switches for adjacent information acquisition 211-226 are turned ON when another projection display unit is arranged adjacent to its own projection display unit. The ON/OFF state is supplied to image signal correction units 331-346 as the above-described adjacent information.

Each of image signal correction units 331-346 generates a brightness correction table on the basis of the image signals corresponding to a specific picture element of the projected image that is projected onto the screen from an adjacent projector unit and on the basis of the brightness of the specific picture element of the projected image that is projected onto the screen from the adjacent projector unit and captured by the corresponding camera unit to match the brightness of the projected image of its own projector unit with the brightness of the projected image of the adjacent projector unit. Each of image signal correction units 331-346 further refers to the generated brightness correction table to correct the brightness of each color of the image signals that are applied as input to its own projector unit and supplies as output the brightness-corrected image signals that follow correction.

Image projection units 351-366 project light of each color onto the screen in accordance with the brightness-corrected image signals that are supplied from image signal correction units 331-346.

The operations of the projector units 1-16 shown in FIG. 11 are next described using the accompanying drawings. The processes described hereinbelow are each executed by corresponding image signal correction units 331-346 that are provided in projector units 1-16.

Figure 12:
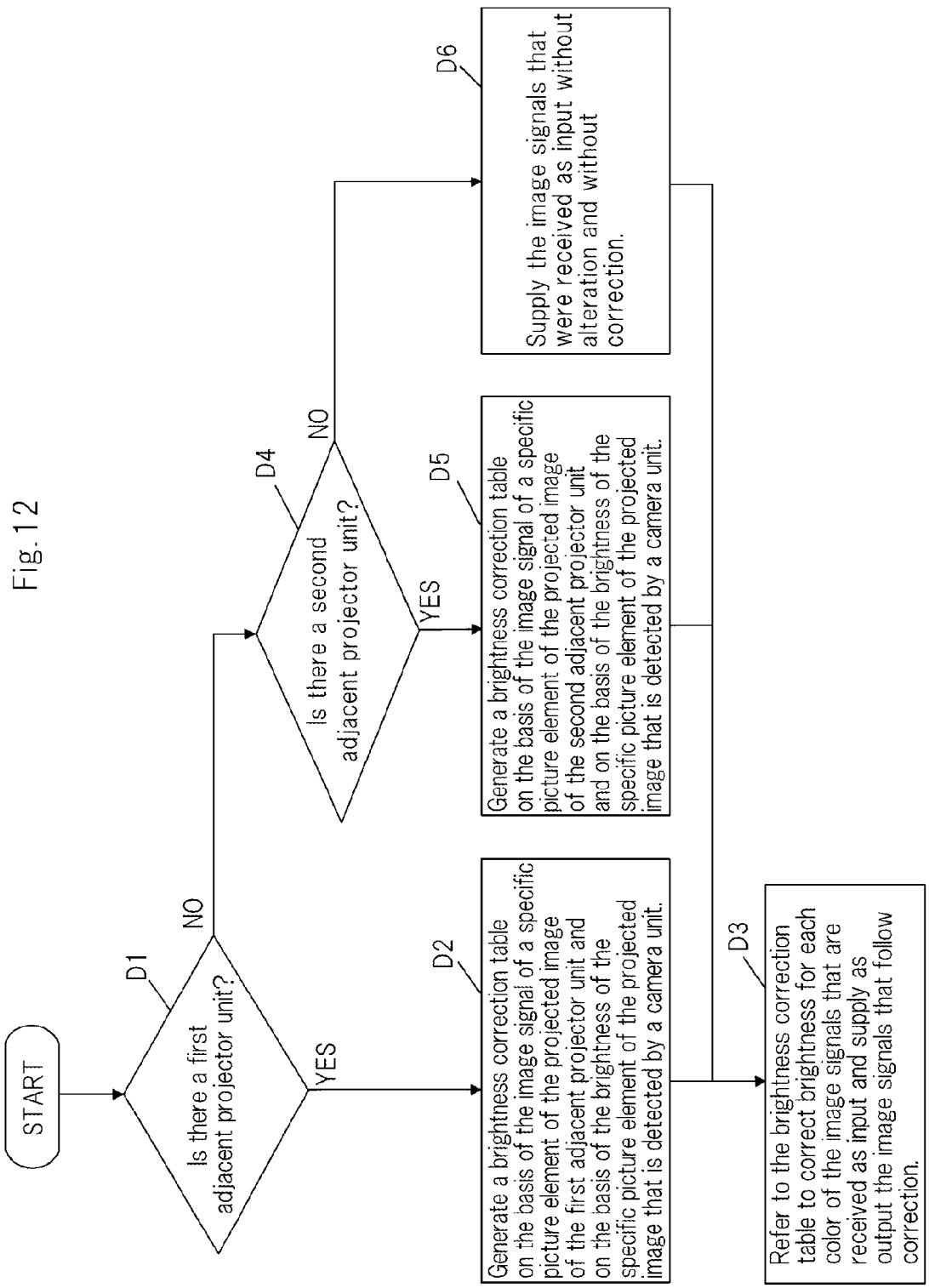
FIG. 12 is a flow chart showing the processing procedure of the image signal correction units shown in FIG. 11.

FIG. 12 is a flow chart showing the processing procedure of the image signal correction units shown in FIG. 11.

As shown in FIG. 12, each of image signal correction units 331-346 first judges whether there is a first adjacent projector unit that is adjacent to its own projector unit in, for example, the leftward direction (first direction) based on the adjacent information indicated by the ON or OFF state of the corresponding mechanical switch for adjacent information acquisition (Step D1).

When there is a first adjacent projector unit, each of image signal correction units 331-346 generates the above-described brightness correction table on the basis of the image signal that corresponds to a specific picture element of the projected image that is realized by the first adjacent projector unit and on the basis of the brightness of the specific picture element of the projected image that is realized by the first adjacent projector unit that is detected by the corresponding camera unit (Step D2).

Each of image signal correction units 331-346 next refers to the brightness correction table that was generated in Step D2 to correct the brightness for each color of the image signals that are applied as input to its own projector unit and supplies as output the brightness-corrected image signals that follow the correction (Step D3).

When it is judged in Step D1 that there is no first adjacent projector unit, each of image signal correction units 331-346 judges on the basis of the adjacent information that is indicated by the ON or OFF state of the mechanical switch for adjacent information acquisition whether there is a second adjacent projector unit that is adjacent to its own projector unit in, for example, the downward direction (second direction) (Step D4).

If there is a second adjacent projector unit, each of image signal correction units 331-346 generates the above-described brightness correction table on the basis of the image signal of a specific picture element of the projected image that is realized by the second adjacent projector unit and on the basis of the brightness of the specific picture element of the projected image that is realized by the second adjacent projector unit that is detected by the corresponding camera unit (Step D5).

Each of image signal correction units 331-346 next refers to the brightness correction table that was generated in Step D5 to correct the brightness of each color of the image signals that are applied as input to its own projector unit and supplies as output the brightness-corrected image signals that follow correction (Step D3).

When it is determined in Step D4 that there is no second adjacent projector unit, each of image signal correction units 331-346 supplies as output the image signals that are applied as input to its own projector unit without alteration and without correction (Step D6).

Figure 13:
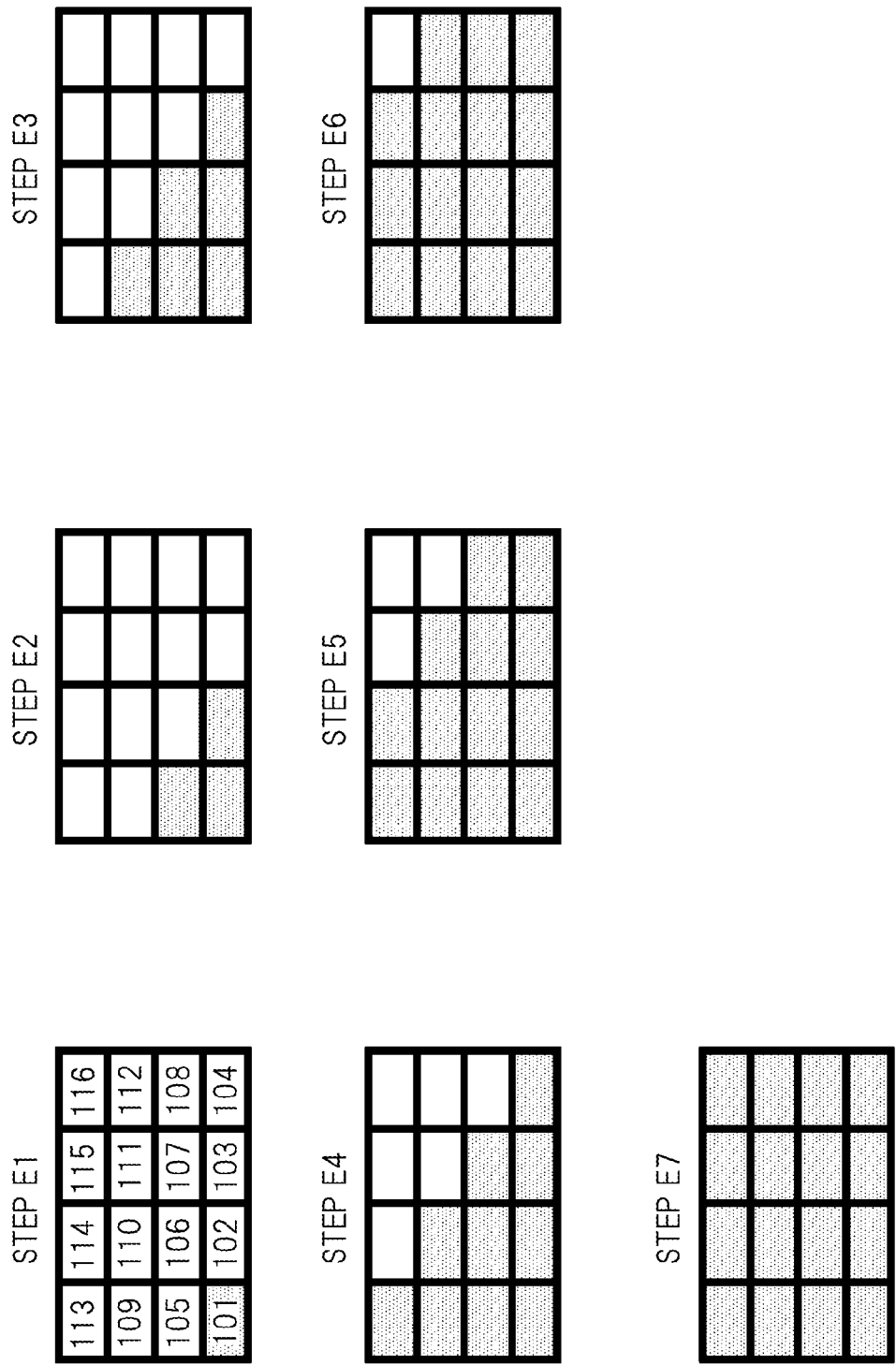
FIG. 13 is a schematic view showing the state in which brightness adjustment is executed by the projector units of the first working example.

The operations of each of projector units 1-16 that are provided in the multi-projection display system of the first working example are next described using FIG. 13.

FIG. 13 is a schematic view showing the state in which brightness adjustment is executed by a projector unit of the first working example.

As shown in FIG. 13, because an adjacent projector unit is not present in the leftward and downward directions, projector unit 101 projects light of each color onto a screen in accordance with the image signals without correcting the image signals that are applied as input to its own projector unit (Step E1).

Because adjacent projector unit 101 is present in the leftward direction, projector unit 102 generates a brightness correction table on the basis of the image signal that corresponds to a specific picture element of the projected image that is realized by projector unit 101 and on the basis of the brightness of the specific picture element of the projected image of this projector unit 101 that is detected by the corresponding camera unit, refers to the brightness correction table to correct brightness for each color of the image signals that are received as input, and projects light of each color onto the screen in accordance with the brightness-corrected image signals that follow correction. In addition, because adjacent projector unit 101 is present in the downward direction, projector unit 105 generates a brightness correction table on the basis of the image signal that corresponds to a specific picture element of the projected image that is realized by this projector unit 101 and on the basis of the brightness of the specific picture element of the projected image of this projector unit 101 that is detected by the corresponding camera unit, refers to this brightness correction table to correct the brightness for each color of image signals that are received as input, and projects light of each color onto a screen in accordance with the brightness-corrected image signals that follow correction (Step E2).

Because adjacent projector unit 102 is present in the leftward direction, projector unit 103 next generates a brightness correction table on the basis of the image signal that corresponds to a specific picture element of the projected image of this projector unit 102 and on the basis of the brightness of the specific picture element of the projected image of this projector unit 102 that is detected by the corresponding camera unit, refers to this brightness correction table to correct brightness for each color of the image signals that are received as input, and projects the light of each color onto a screen in accordance with the brightness-corrected image signals that follow correction. Similarly, because adjacent projector unit 105 is present in the leftward direction, projector unit 106 generates a brightness correction table on the basis of the image signal that corresponds to the specific picture element of the projected image that is realized by this projector unit 105 and on the basis of the brightness of the specific picture element of the projected image of this projector unit 105 that is detected by the corresponding camera unit, refers to this brightness correction table to correct brightness for each color of the image signals that are received as input, and projects light of each color onto a screen in accordance with the brightness-corrected image signals that follow correction. Finally, because adjacent projector unit 105 is present in the downward direction, projector unit 109 generates a brightness correction table on the basis of the image signal that corresponds to the specific picture element of the projected image that is realized by this projector unit 105 and on the basis of the brightness of the specific picture element of the projected image of this projector unit 105 that is detected by the corresponding camera unit, refers to this brightness correction table to correct brightness for each color of the image signals that are received as input, and projects light of each color onto a screen in accordance with the brightness-corrected image signals that follow correction (Step E3).

Subsequently, by the similar execution of brightness adjustment by each of the projector units in accordance with the procedure shown in FIG. 12 up to Step E7, brightness adjustment is completed for all projector units 1-16 that are provided in the multi-projection display system.

Although a specific example of the multi-projection display system of the first exemplary embodiment has been described as shown hereinabove in the present working example, supplying image signals and adjacent information by way of main control unit 82 shown in FIG. 5 to each of projector units 1-16 eliminates the need for the above-described mechanical switches for adjacent information acquisition 211-226 and enables application of the present working example to the multi-projection display system shown in the second exemplary embodiment.

Second Working Example

The first working example of the present invention is next described using the accompanying drawings.

Figure 14:
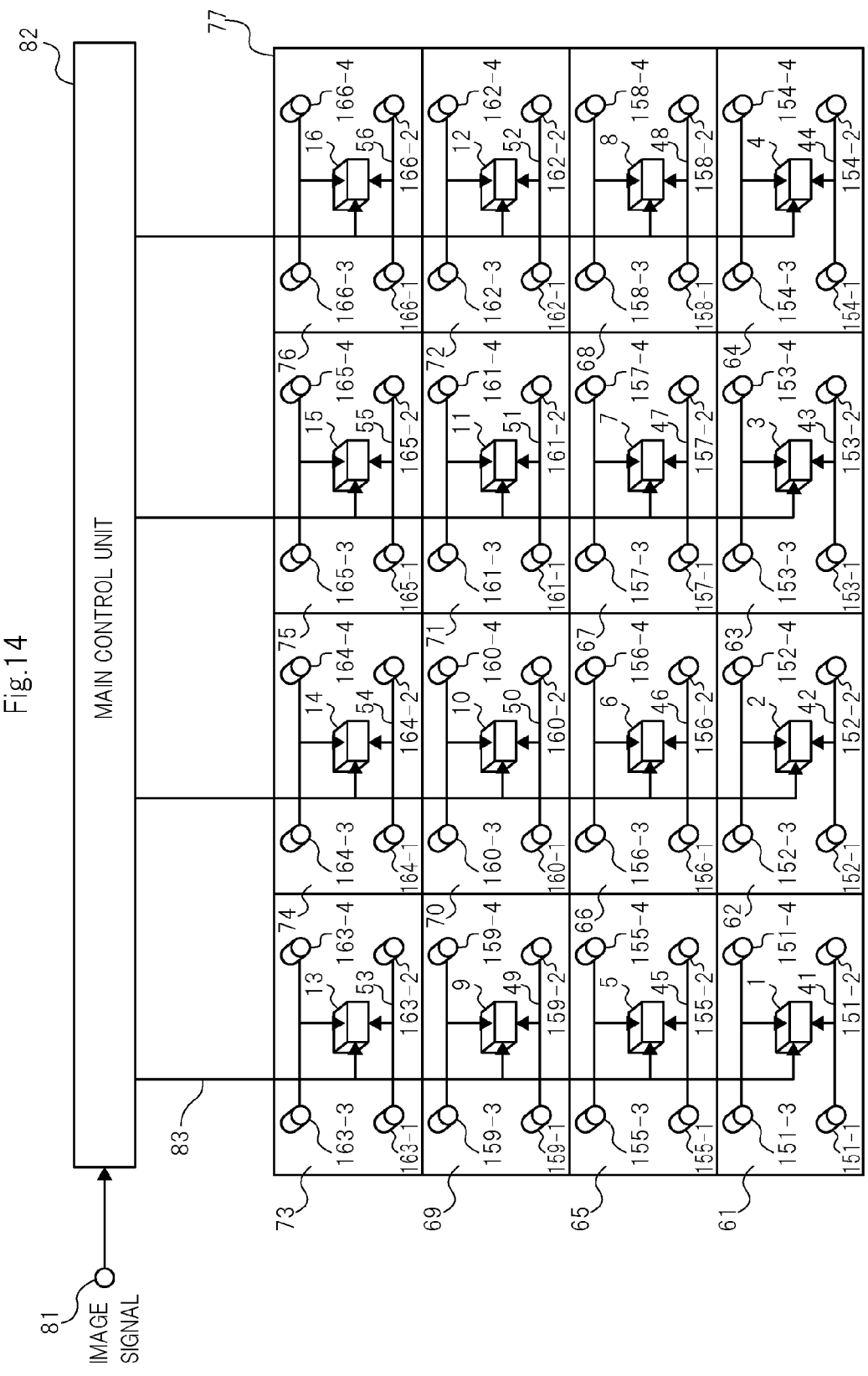
FIG. 14 is a plan view showing a configuration of the multi-projection display system of the second working example.
Figure 15:
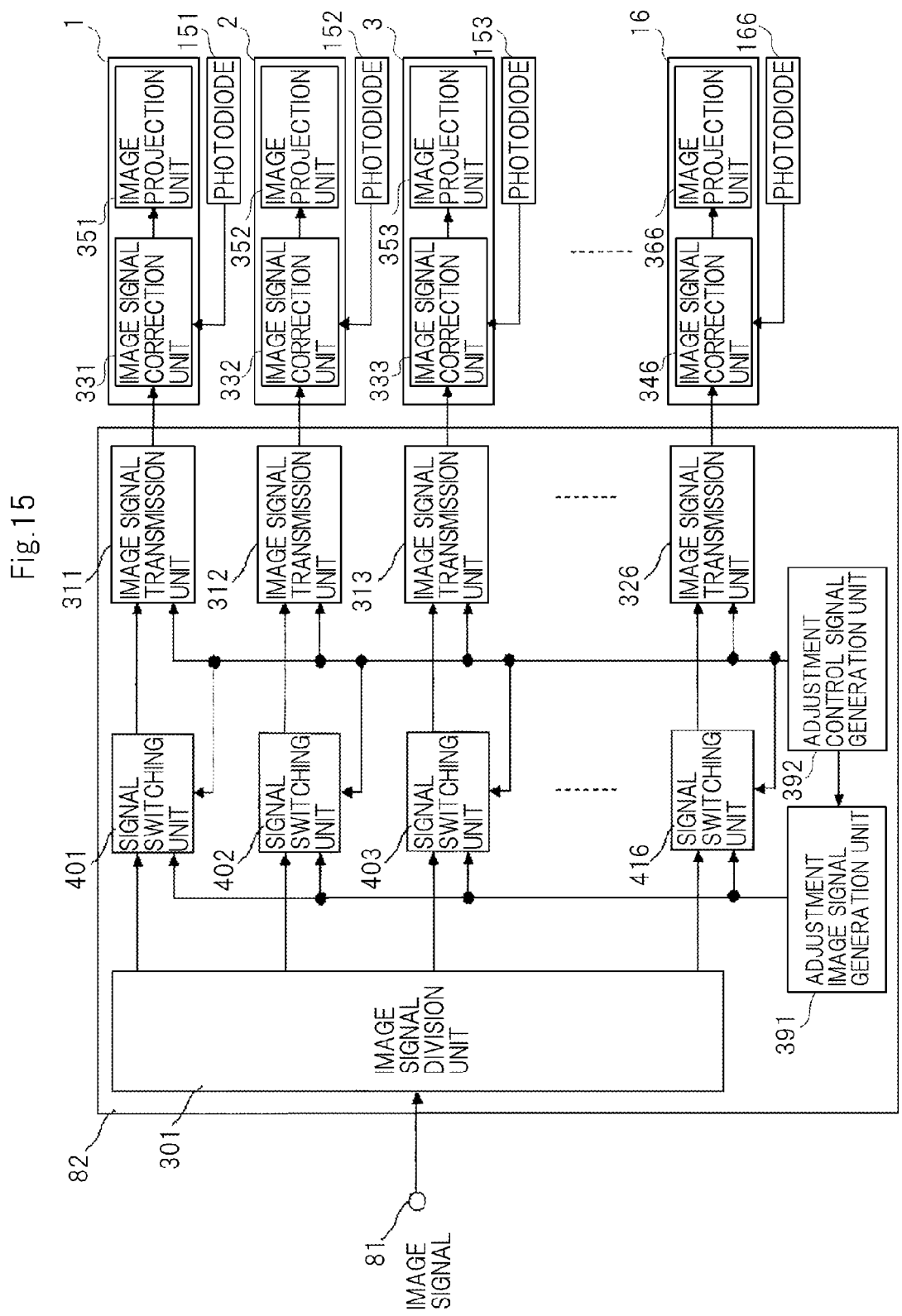
FIG. 15 is a block diagram showing an example of the configuration of the main control unit and projector units shown in FIG. 14.

FIG. 14 is a plan view showing the configuration of the multi-projection display system of the second working example, and FIG. 15 is a block diagram showing an example of the configuration of the main control unit and projector units shown in FIG. 14.

In the second working example, an actual example of the multi-projection display system of the above-described third exemplary embodiment is described.

As shown in FIG. 14, the multi-projection display system of the second working example includes a plurality of projector units 1-16, a plurality of photodiodes 151-166, and main control unit 82. Photodiodes 151-166 are provided one-to-one in correspondence with each of projector units 1-16. In addition, reference numbers 61-77 of FIG. 14 each show the size on the screen of the projected images that are projected from each of projector units 1-16. Photodiodes 151-166 are installed in positions that allow detection of the brightness of specific picture elements (picture elements of the outermost periphery) of projected images that are projected onto the screen from projector units 1-16.

As shown in FIG. 15, main control unit 82 is equipped with image signal division unit 301, adjustment image signal generation unit 391, signal switching units 401-416, adjustment control signal generation unit 392, and image signal transmission units 311-326. Projector units 1-16 are equipped with image signal correction unit 331 and image projection unit 351.

Image signals are applied as input to main control unit 82 from an image reproduction device (not shown in the figures) by way of image signal input unit 81. Main control unit 82 divides the image signals that are received as input and distributes the image signals that correspond to each of projector units 1-16.

In main control unit 82, the presence or absence of adjacent projector units for each of projector units 1-16 is already known. Image signal division unit 301 both divides the image signals that are received as input into image signals that correspond to each of projector units 1-16 and generates adjacent information that indicates the presence or absence of adjacent projector units for each projector unit.

Figure 16:
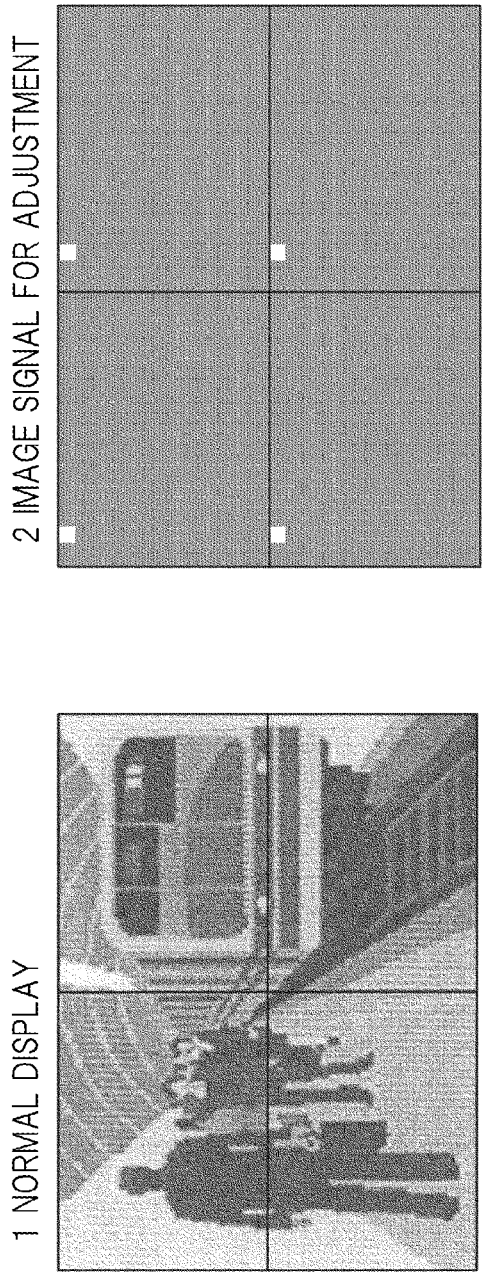
FIG. 16 is a schematic view showing an example of an image during normal display and an example of an image for adjustment that are used in the multi-projection display system of the second working example.

Adjustment image signal generation unit 391 generates predetermined adjustment image signals. The adjustment image signals are image signals for displaying adjustment images that are used during brightness adjustment in each of projector units 1-16. The adjustment images are images that display, for example, a specific picture element by a predetermined color and predetermined brightness and that display picture elements other than the specific picture elements as black (brightness level 0%). FIG. 16 shows an example of an image that is displayed during normal display and an example of an adjustment image that is generated by the adjustment image signal generation unit shown in FIG. 15.

Adjustment control signal generation unit 392 supplies adjustment control signals that provide instructions to each of projector units 1-16 of the timing at which adjustment of brightness is to be executed.

Signal switching units 401-416 switch the output signals in accordance with the adjustment control signals that are supplied from adjustment control signal generation unit 392. Signal switching units 401-416 supply image signals that are supplied from image signal division unit 301 during normal display and supply adjustment image signals that are supplied from adjustment image signal generation unit 391 during brightness adjustment.

Image signal transmission units 311-326 transmit the image signals that are supplied from signal switching units 401-416, adjacent information, and the control signals for adjustment that are supplied from adjustment control signal generation unit 392 to each of corresponding projector units 1-16.

Photodiodes 151-166 detect brightness for each color of projected images that are projected onto the screen from image projection units 351-366 and supply these detection results to image signal correction units 331-346.

At the time that brightness adjustment is instructed by the adjustment control signal, each of image signal correction units 331-346 generates a brightness correction table on the basis of the image signals of the projected image that is projected onto the screen from an adjacent projector unit and on the basis of the brightness of the projected image that is projected onto the screen from the adjacent projector unit that is detected by the corresponding photodiode for matching the brightness of the projected image of its own projector unit with the brightness of the projected image of the adjacent projector unit. Each of image signal correction units 331-346 further refers to the generated brightness correction table to correct brightness for each color of the image signals that are applied as input to its own projector unit and supplies as output the brightness-corrected image signals that follow correction.

Image projection units 351-366 project light of each color onto the screen in accordance with the brightness-corrected image signals that are supplied from image signal correction units 331-346.

Because only specific picture elements of a projected image are displayed by a predetermined color and by predetermined brightness as images for adjustment in the present working example, the brightness of the picture elements can be detected by using photodiodes 151-166 and the brightness of projected images realized by adjacent projector unit can be detected.

Accordingly, in the multi-projection display system of the present working example, photodiodes 151-166 can be used in place of camera units 21-36 shown in the first working example to detect the brightness of projected images realized by adjacent projector units, whereby the multi-projection display system can be realized at a lower cost than that of the first working example.

Third Working Example

Figure 17:
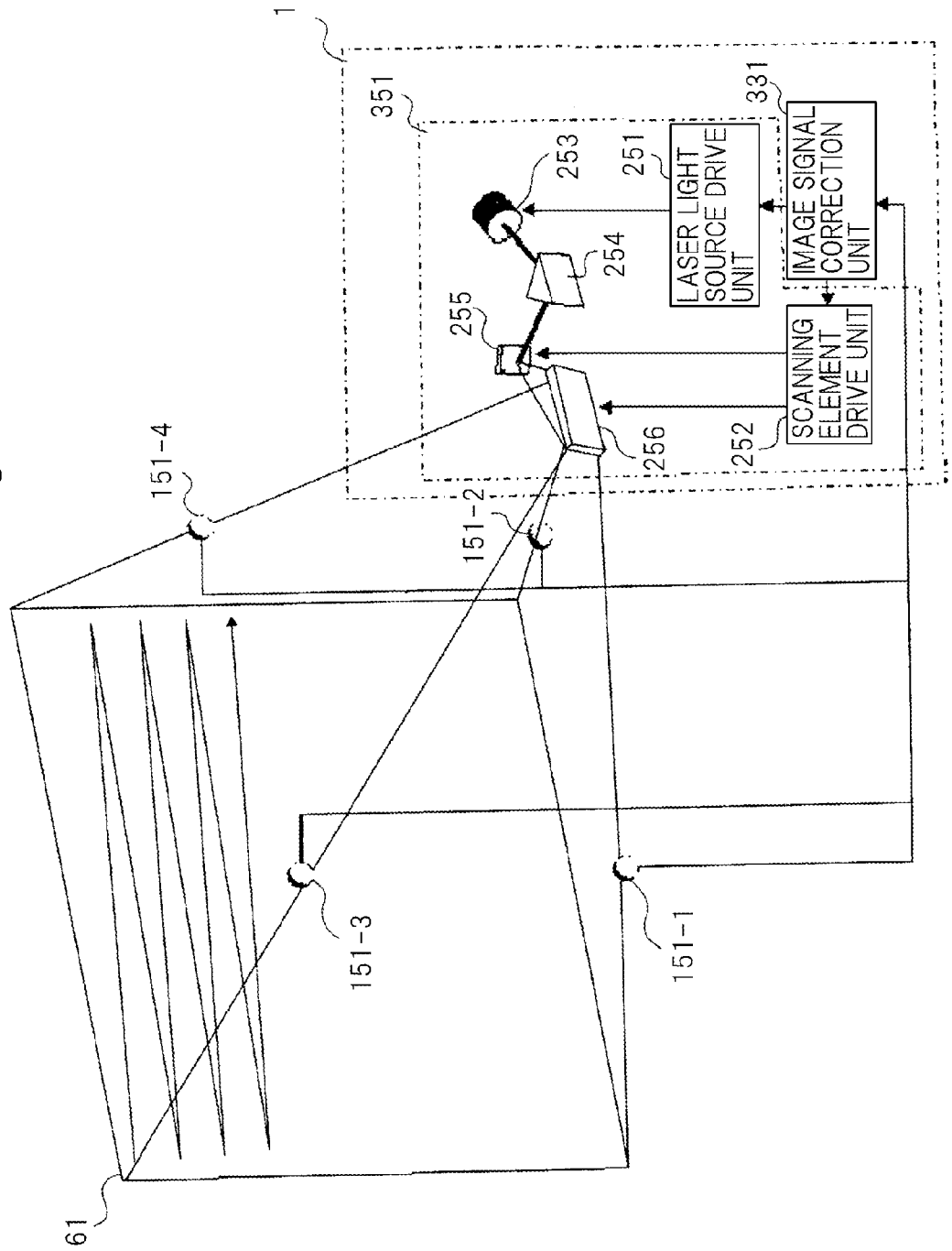
FIG. 17 is a block diagram showing the configuration of the multi-projection display system of the third working example.

FIG. 17 is a block diagram showing the configuration of the multi-projection display system of the third working example.

The third working example is an example that uses, as a projection display unit, a laser scanning projector that forms an image by scanning laser light of three colors, R (red), G (green), and B (blue), that are projected onto a screen in a horizontal direction and a vertical direction. Similar to the second working example, the projector units are each supplied with: adjacent information and image signals from main control unit 82 that is equipped with image signal division unit 301, adjustment image signal generation unit 391, signal switching units 401-416, adjustment control signal generation unit 392, and image signal transmission units 311-326; project images in accordance with the image signals that are supplied from image signal division unit 301 during normal display; and project images in accordance with the image signals that are to be adjusted that are supplied from adjustment image signal generation unit 391 during brightness adjustment.

As shown in FIG. 17, the projection display unit includes projector unit 1 and photodiodes 151-1-151-4. Projector unit 1 is equipped with image signal correction unit 331 and image projection unit 351. Image projection unit 351 is equipped with laser light source drive unit 251, scanning element drive unit 252, laser light source 253, optics 254, horizontal scanning element 255, and vertical scanning element 256.

Photodiodes 151-1-151-4 detect brightness for each color of a projected image that is projected onto a screen from image projection unit 351 and supplies the detection results to image signal correction unit 331.

When brightness adjustment has been instructed by an adjustment control signal from main control unit 82, image signal correction unit 331 generates a brightness correction table on the basis of the image signals of the projected image that is projected onto the screen from an adjacent projector unit and on the basis of the brightness of the projected image that is projected onto the screen from the adjacent projector unit that is detected by photodiodes 151-1-151-4 to match the brightness of the projected image of its own projector unit 1 with the brightness of the projected image of the adjacent projector unit. Image signal correction unit 331 further refers to the generated brightness correction table to correct the brightness for each color of the image signals that are received as input in its own projector unit and supplies as output the brightness-corrected image signals that follow correction.

Laser light source drive unit 251 generates the drive signal of laser light source 253 in accordance with the output signal of image signal correction unit 331 and causes laser light source 253 to emit laser light.

Scanning element drive unit 252 generates each of the drive signals of horizontal scanning element 255 and vertical scanning element 256 in accordance with a horizontal synchronizing signal and vertical synchronizing signal supplied from image signal correction unit 331.

The output light of laser light source 253 is projected and scanned on the screen by way of optics 254, horizontal scanning element 255 and vertical scanning element 256 and forms projected images.

As with the second working example, according to the third working example, only specific picture elements of a projected image are displayed by predetermined colors and by predetermined brightness as images for adjustment, and as a result, photodiodes 151-1-151-4 can be used to detect the brightness of the picture elements, and the brightness of the projected image realized by an adjacent projector unit can be detected.

Accordingly, because the brightness of projected images realized by adjacent projector units can be detected using photodiodes 151-166 in place of camera units 21-36 shown in the first working example, a multi-projection display system can be realized at lower cost than the first working example.

Still further, because a laser scanning projector is used as the projector unit, a multi-projection display system can be constructed at lower cost, and moreover, can be constructed more easily than the first exemplary embodiment.

Although the invention of the present application has been described with reference to exemplary embodiments, the invention of the present application is not limited to the above-described exemplary embodiments. The configuration and the details of the invention of the present application are open to various modifications within the scope of the invention of the present application that will be clear to anyone of ordinary skill in the art.

The present application is based upon and claims the benefit of priority from Japanese patent application No. 2010-266956 filed on Nov. 30, 2010, the disclosure of which is incorporated herein in its entirety by reference.

What is claimed is:

1. A multi-projection display system that joins together projected images that are projected onto a screen from a plurality of projector units to display the image as one image comprising:
a plurality of sensor units that are provided in correspondence with said projector units and that detect brightness for each color of projected images that are projected onto said screen from said projector units and supply the detection results as output;
wherein said projector units each include:
an image signal correction unit that judges whether there is an adjacent projector unit arranged adjacent to its own projector unit, that generates a brightness correction table on the basis of the image signal of a specific picture element of a projected image realized by said adjacent projector unit and on the basis of the brightness of said specific picture element of the projected image of said adjacent projector unit that is detected by said sensor unit for matching the brightness of the projected image of its own projector unit with the brightness of the projected image of the adjacent projector unit, that refers to the generated brightness correction table to correct brightness for each color of image signals that are applied as input to its own projector unit, and that supplies as output brightness-corrected image signals that follow correction; and
an image projection unit that projects light of each color onto a screen in accordance with image signals that are supplied from said image signal correction unit to display an image.

2. The multi-projection display system as set forth in claim 1, wherein said image signal correction unit:
judges whether there is a first adjacent projector unit that is adjacent to its own projector unit in a first direction that is set in advance;
when said first adjacent projector unit exists, generates said brightness correction table on the basis of image signals that correspond to a specific picture element of a projected image that is realized by the first adjacent projector unit and on the basis of the brightness of the specific picture element of the projected image that is realized by the first adjacent projector unit that is detected by a corresponding sensor unit;
when said first adjacent projector unit is not present, judges whether there is a second adjacent projector unit that is adjacent in a second direction that crosses said first direction;
when said second adjacent projector unit exists, generates said brightness correction table on the basis of image signals that correspond to a specific picture element of the projected image that is realized by the second adjacent projector unit and on the basis of brightness of the specific picture element of the projected image that is realized by the second adjacent projector unit that is detected by a corresponding sensor unit; and
when said first adjacent projector unit and said second adjacent projector unit are not present, supplies as output image signals that are applied as input to its own projector unit without alteration and without correction.

3. The multi-projection display system as set forth in claim 1, wherein said projector unit further comprises:
an adjacent information acquisition unit that judges whether said adjacent projector unit is present and supplies the judgment result as said adjacent information to said image signal correction unit.

4. The multi-projection display system as set forth in claim 1, further comprising:
a main control unit that both divides image signals that are received as input into image signals that correspond to the projected image of each projector unit and transmits to each corresponding projector unit image signals that follow said division and adjacent information that indicates whether said adjacent projector unit, that corresponds to each said projector unit, is present.

5. The multi-projection display system as set forth in claim 4, wherein said main control unit both divides image signals that are received as input into image signals that correspond to each projector unit and adds, to the image signals that follow the division, image signals of one or more picture elements of the outermost periphery of projected images realized by each of said adjacent projector units and distributes the image signals that include the added signals to each of said projector units.

6. The multi-projection display system as set forth in claim 4, wherein said main control unit comprises:
an image signal division unit that both divides image signals that are received as input into image signals that correspond to projected images of each projector unit and generates adjacent information that indicates whether said adjacent projector unit for each said projector unit is present;
an adjustment image signal generation unit that generates image signals for adjustment that are image signals for causing predetermined images for adjustment used at the time of adjusting brightness to be displayed on said projector unit;

an adjustment control signal generation unit that supplies adjustment control signals that instruct the timing of executing brightness adjustment to said projector units;

a signal switching unit that, in accordance with said adjustment control signal, supplies as output image signals that are supplied from said image signal division unit at the time of normal display and supplies as output said image signals for adjustment that are supplied from said adjustment image signal generation unit at the time of brightness adjustment; and an image signal transmission unit that transmits image signals that are supplied from said signal switching unit, and that transmits said adjacent information and said adjustment control signals that are supplied from said adjustment control signal generation unit to each of corresponding projector units.

7. The multi-projection display system as set forth in claim 6, wherein said sensor units are photodiodes.

8. The multi-projection display system as set forth in claim 1, wherein said image projection unit is a laser scanning projector.

9. A brightness adjusting method of a multi-projection display system that joins together projected images that are projected onto a screen from a plurality of projector units to display as one image, comprising step of:

providing a plurality of sensor units corresponding to said projector units that detect brightness for each color of projected images that are projected onto said screen from said projector units and supply the detection results; wherein, each projector unit: judges whether there is an adjacent projector unit that is arranged adjacent to its own projector unit, generates a brightness correction table on the basis of the image signals of specific picture elements of projected images that are realized by said adjacent projector units and on the basis of the brightness of said specific picture elements of projected images of said adjacent projector units that is detected by said sensor units for matching the brightness of the projected image of its own projector unit with the brightness of the projected images of the adjacent projector unit, and refers to the generated brightness correction table to correct brightness for each color of image signals that are applied as input to its own projector unit; and projects light of each color onto a screen in accordance with the brightness-corrected image signals that follows correction to display an image.

10. The brightness adjusting method of the multi-projection display system as set forth in claim 9, wherein each of said projector units:

judges whether there is a first adjacent projector unit that is adjacent to its own projector unit in a first direction that is set in advance;

when there is said first adjacent projector unit, generates said brightness correction table on the basis of image signals that correspond to a specific picture element of the projected image realized by the first adjacent projector unit and on the basis of the brightness of the specific picture element of the projected image that is realized by the first projector unit that is detected by a corresponding sensor unit;

when said first adjacent projector unit does not exist, judges whether a second adjacent projector unit that is adjacent in a second direction that crosses said first direction is present;

generates said brightness correction table on the basis of image signals that correspond to specific a picture element of a projected image realized by the second adjacent projector unit and on the basis of the brightness of the specific picture element of the projected image realized by the second adjacent projector unit that is detected by a corresponding sensor unit; and when said first adjacent projector unit and said second adjacent projector unit are not present, supplies image signals that are applied as input to its own projector unit as output without alteration and without correction.

* * * * *